(12) United States Patent
Choi et al.

(10) Patent No.: US 12,514,093 B2
(45) Date of Patent: Dec. 30, 2025

(54) DISPLAY DEVICE

(71) Applicant: Samsung Display Co., LTD., Yongin-si (KR)

(72) Inventors: Min Oh Choi, Yongin-si (KR); Gee Bum Kim, Seoul (KR); Kwang Soo Bae, Yongin-si (KR); Bo Kwang Song, Hwaseong-si (KR); Dae Young Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 707 days.

(21) Appl. No.: 17/867,461

(22) Filed: Jul. 18, 2022

(65) Prior Publication Data

US 2023/0118413 A1    Apr. 20, 2023

(30) Foreign Application Priority Data

Oct. 1, 2021    (KR) .................. 10-2021-0130549

(51) Int. Cl.
*H10K 59/65*    (2023.01)
*G06F 3/044*    (2006.01)
*H10K 59/122*    (2023.01)
*H10K 59/40*    (2023.01)
*H10K 59/80*    (2023.01)

(52) U.S. Cl.
CPC ........... *H10K 59/65* (2023.02); *G06F 3/0445* (2019.05); *G06F 3/0446* (2019.05); *H10K 59/122* (2023.02); *G06F 2203/04112* (2013.01); *H10K 59/40* (2023.02); *H10K 59/8792* (2023.02)

(58) Field of Classification Search
None
See application file for complete search history.

(56) References Cited

U.S. PATENT DOCUMENTS

| | | | |
|---|---|---|---|
| 10,936,126 | B2 | 3/2021 | Lee et al. |
| 2021/0064159 | A1 | 3/2021 | Yeke Yazdandoost et al. |
| 2022/0181406 | A1* | 6/2022 | Seo .................. H10K 59/40 |

FOREIGN PATENT DOCUMENTS

| | | |
|---|---|---|
| KR | 10-2020-0049959 A | 5/2020 |
| KR | 10-2021-0004867 A | 1/2021 |
| KR | 10-2021-0037556 A | 4/2021 |

* cited by examiner

*Primary Examiner* — Kyoung Lee
(74) *Attorney, Agent, or Firm* — Womble Bond Dickinson (US) LLP

(57) ABSTRACT

A display device includes: a substrate; a plurality of light emitting parts on the substrate, and to emit light; a plurality of light sensing parts on the substrate, and to sense incident light; a bank layer partitioning the plurality of light emitting parts and the plurality of light sensing parts; and a touch sensing layer including a touch electrode on the bank layer. A first distance between one light sensing part from among the plurality of light sensing parts and the touch electrode in one direction is smaller than a second distance between a first light emitting part of the plurality of light emitting parts and the touch electrode in the one direction.

20 Claims, 16 Drawing Sheets

DISPLAY DEVICE

CROSS-REFERENCE TO RELATED APPLICATION

This application claims priority to and the benefit of Korean Patent Application No. 10-2021-0130549, filed on Oct. 1, 2021 in the Korean Intellectual Property Office, the entire content of which is incorporated by reference herein.

BACKGROUND

1. Field

Aspects of one or more embodiments of the present disclosure relate to a display device.

2. Description of the Related Art

The importance of display devices has increased with the development of multimedia. Accordingly, various types of display devices, such as a liquid crystal display (LCD) and an organic light emitting display (OLED), have been used.

From among the display devices, the organic light emitting display displays an image by using an organic light emitting diode (OLED) for generating light by recombination of electrons and holes. Such an organic light emitting display may have a fast response speed, a large luminance, and a wide viewing angle, and may be driven with low power consumption.

Recently, research and development for integrating sensors for touch recognition or fingerprint recognition in a display panel has been conducted. In this case, some of the light emitted from a light emitting part may be reflected by a touch electrode, and may move to and be incident on an optical sensor for fingerprint recognition, and thus, may act as noise.

The above information disclosed in this Background section is for enhancement of understanding of the background of the present disclosure, and therefore, it may contain information that does not constitute prior art.

SUMMARY

One or more embodiments of the present disclosure are directed to a display device in which light reflected by a touch electrode of a touch sensing layer that may be incident on an optical sensor may be reduced, minimized, or prevented.

However, the aspects and features of the present disclosure are not limited to those set forth above. The above and other aspects and features of the present disclosure will become more apparent to those having ordinary skill in the art to which the present disclosure pertains from the detailed description of the present disclosure below with reference to the figures.

According to one or more embodiments of the present disclosure, a display device includes: a substrate; a plurality of light emitting parts on the substrate, and configured to emit light; a plurality of light sensing parts on the substrate, and configured to sense incident light; a bank layer partitioning the plurality of light emitting parts and the plurality of light sensing parts; and a touch sensing layer including a touch electrode on the bank layer. A first distance between one light sensing part from among the plurality of light sensing parts and the touch electrode in one direction is smaller than a second distance between a first light emitting part of the plurality of light emitting parts and the touch electrode in the one direction.

In an embodiment, a width of the one light sensing part in the one direction may be greater than the first distance.

In an embodiment, a ratio of the width of the one light sensing part to the first distance in the one direction may be greater than 2.2 and smaller than 3.5.

In an embodiment, a width of the first light emitting part in the one direction may be greater than the width of the one light sensing part in the one direction.

In an embodiment, the touch electrode may overlap with the bank layer.

In an embodiment, a width of the touch electrode may be smaller than a width of the one light sensing part.

In an embodiment, the touch electrode may include a mesh pattern.

In an embodiment, the first light emitting part may include a plurality of first light emitting parts, and the first light emitting parts and the light sensing parts may be repeatedly arranged along the one direction.

In an embodiment, the first light emitting parts may be configured to emit light having a green wavelength.

In an embodiment, the display device may further include: an emission layer in each of the plurality of light emitting parts on the substrate; a photoelectric conversion layer in each of the plurality of light sensing parts on the substrate; and a common electrode on the emission layer and the photoelectric conversion layer.

According to one or more embodiments of the present disclosure, a display device includes: a substrate; a pixel electrode and a first electrode on the substrate; a bank layer exposing the pixel electrode and the first electrode; an emission layer on the pixel electrode; a photoelectric conversion layer on the first electrode; a common electrode on the emission layer, the photoelectric conversion layer, and the bank layer; a touch sensing layer including a touch electrode on the bank layer; a first hole defined by the touch electrode, and overlapping with the emission layer; and a second hole overlapping with the photoelectric conversion layer. The first hole and the second hole overlap with the bank layer.

In an embodiment, a width in one direction of a portion of the bank layer overlapping with the first hole may be greater than a width in the one direction of a portion of the bank layer overlapping with the second hole.

In an embodiment, the touch electrode may overlap with the bank layer.

In an embodiment, the touch sensing layer may include: a first touch conductive layer; a touch insulating layer on the first touch conductive layer; and a second touch conductive layer on the touch insulating layer.

In an embodiment, the touch electrode may include: a plurality of sensor parts arranged along one direction; and a connection part connecting the plurality of sensor parts to each other, and the first touch conductive layer may include the connection part, and the second touch conductive layer may include the plurality of sensor parts.

In an embodiment, the plurality of sensor parts may include a mesh pattern.

In an embodiment, the display device may further include a light blocking pattern on the touch sensing layer, and overlapping with the bank layer.

In an embodiment, the first hole and the second hole may overlap with the light blocking pattern.

According to one or more embodiments of the present disclosure, a display device includes: a substrate; a plurality of light emitting parts on the substrate, and configured to emit light; a plurality of light sensing parts on the substrate, and configured to sense incident light; a bank layer partitioning the plurality of light emitting parts and the plurality of light sensing parts; a touch sensing layer including a touch electrode on the bank layer; a first hole defined by the touch electrode, and exposing one of the plurality of light emitting parts; and a second hole defined by the touch electrode, and exposing one of the plurality of light sensing parts. The first hole and the second hole overlap with the bank layer.

In an embodiment, a width in one direction of a portion of the bank layer overlapping with the first hole may be greater than a width in the one direction of a portion of the bank layer overlapping with the second hole.

According to one or more embodiments of the present disclosure, a display device may be provided in which light reflected by a touch electrode and incident on an optical sensor may be minimized or reduced by disposing the touch electrode of a touch sensing layer to be more adjacent to a light sensing part on which light may be incident than to a light emitting part that emits the light. In addition, because a process of disposing a separate light blocking member below the touch electrode may be omitted, processing costs may be reduced, and manufacturing processes thereof may be simplified.

However, the aspects and features of the present disclosure are not limited to the aforementioned aspects and features, and various other aspects and features may be included in the present specification as would be understood by those having ordinary skill in the art.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
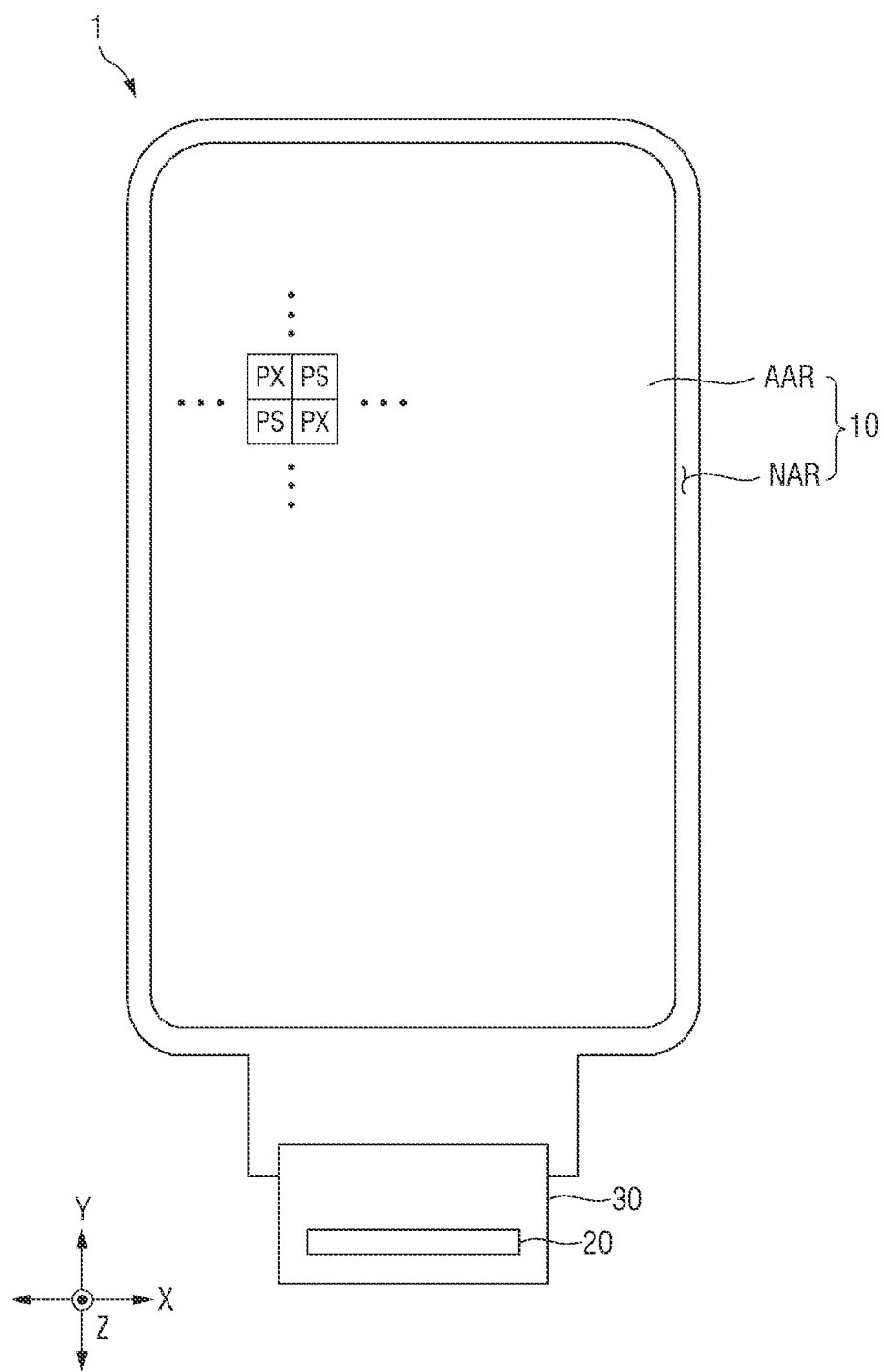
FIG. 1 is a plan view of a display device according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a plan view of a display device according to an embodiment.

In FIG. 1, a first direction X, a second direction Y, and a third direction Z are shown. The first direction X is a direction that is parallel to or substantially parallel to one side of a display device 1 in a plan view, and may be, for example, a transverse direction of the display device 1. The second direction Y is a direction that is parallel to or substantially parallel to another side of the display device 1 that contacts (e.g., that meets or forms a corner with) the one side of the display device 1 in the plan view, and may be a longitudinal direction of the display device 1. For example, the second direction Y may be a direction that crosses the first direction X. Hereinafter, for convenience of description, one side in the first direction X will refer to a right direction in the plan view, another side (or the other side) in the first direction X will refer to a left direction in the plan view, one side in the second direction Y will refer to an upper direction in the plan view, and another side (or the other side) in the second direction Y will refer to a lower direction in the plan view. A third direction Z may be a thickness direction of the display device 1. For example, the third direction Z may be perpendicular to or substantially perpendicular to the first and second directions X and Y. However, the present disclosure is not limited thereto, and it should be understood that the directions described with reference to the various embodiments of the present disclosure are relative directions, and thus, the present disclosure is not limited to the specifically mentioned directions.

Unless otherwise defined, as used in the present specification, the terms "upper", "upper surface", and "upper side" expressed with respect to the third direction Z may refer to a display surface side with respect to a display panel 10, and the terms "lower", "lower surface", and "lower side" expressed with respect to the third direction Z may refer to a side (e.g., an opposite side) that is opposite to the display surface side with respect to the display panel 10.

Referring to FIG. 1, the display device 1 may include various suitable electronic devices for providing a display screen. Examples of the display device 1 may include, but are limited to, mobile phones, smartphones, tablet personal computers (PCs), mobile communication terminals, electronic notebooks, electronic books, personal digital assistants (PDAs), portable multimedia players (PMPs), navigation devices, ultra mobile PCs (UMPCs), televisions, game machines, wrist watch-type electronic devices, head-mounted displays, monitors of personal computers, laptop computers, vehicle instrument boards, digital cameras, camcorders, external billboards, electric signs, various suitable medical devices, various suitable inspection devices, various suitable home appliances that include display areas, such as refrigerators and washing machines, Internet of Things (IoT) devices, and/or the like. Representative examples of the display device 1 described in more detail below may include, but are not limited to, smartphones, tablet PCs, laptop computers, and/or the like.

The display device 1 may include a display panel 10, a panel driver 20, and a circuit board 30.

The display panel 10 may include an active area AAR and a non-active area NAR.

The active area AAR includes a display area in which a screen is displayed. The active area AAR may completely overlap with the display area. A plurality of pixels PX for displaying an image may be disposed at (e.g., in or on) the display area. Each pixel PX may include a light emitting part EMA (e.g., see FIG. 8) for emitting light.

The active area AAR further includes a light sensing area. The light sensing area is an area that responds to incident light, and may be an area configured to sense an amount, a wavelength, and/or the like of the incident light. The light sensing area may overlap with the display area. In an embodiment, the light sensing area may completely overlap with the active area AAR in a plan view. In this case, the light sensing area and the display area may be the same or substantially the same area as each other. In another embodiment, the light sensing area may be disposed only at (e.g., in or on) a portion (e.g., a part) of the active area AAR. For example, the light sensing area may be disposed only at (e.g., in or on) a limited area used for fingerprint recognition. In this case, the light sensing area may overlap with a part of the display area, but may not overlap with another part of the display area.

A plurality of optical sensors PS for responding to light may be disposed at (e.g., in or on) the light sensing area. Each optical sensor PS may include a light sensing part RA (e.g., see FIG. 8) for sensing incident light.

The non-active area NAR may be disposed around (e.g., adjacent to) the active area AAR. For example, the non-active area NAR may surround (e.g., around a periphery of) the active area AAR. The panel driver 20 may be disposed at (e.g., in or on) the non-active area NAR. The panel driver 20 may drive the plurality of pixels PX and/or the plurality of optical sensors PS. The panel driver 20 may output signals and voltages for driving the display panel 10. The panel driver 20 may be formed as an integrated circuit (IC), and may be mounted on the display panel 10. Signal lines for transferring signals between the panel driver 20 and the active area AAR may be further disposed at (e.g., in or on) the non-active area NAR. As another example, the panel driver 20 may be mounted on the circuit board 30.

The circuit board 30 may be attached to one end of the display panel 10 using an anisotropic conductive film (ACF). Lead lines of the circuit board 30 may be electrically connected to pad parts of the display panel 10. The circuit board 30 may be a flexible film, for example, such as a flexible printed circuit board 30 or a chip on film.

Figure 2:
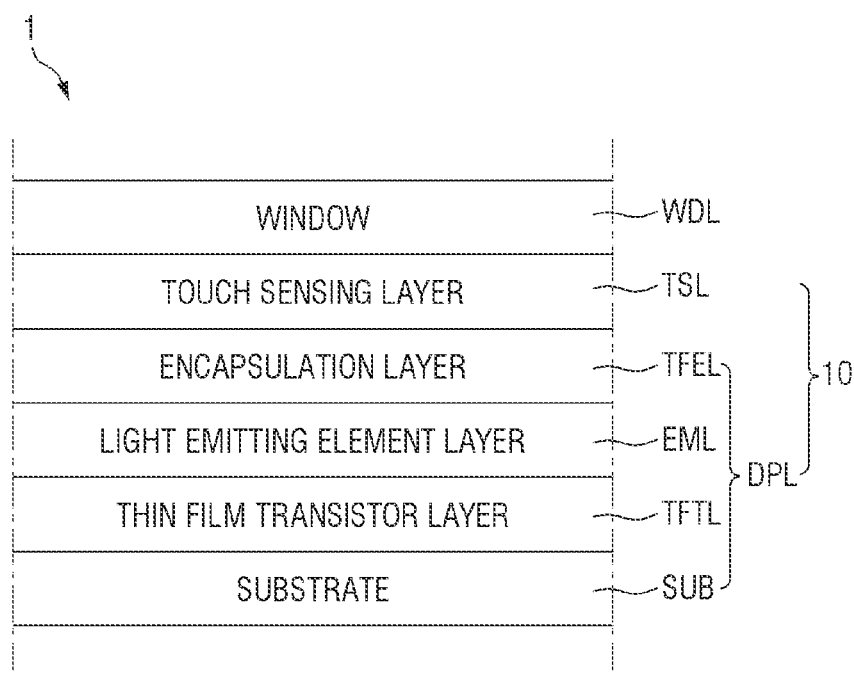
FIG. 2 is a schematic cross-sectional view of the display device according to an embodiment.

FIG. 2 is a schematic cross-sectional view of the display device according to an embodiment.

Referring to FIG. 2, the display device 1 may include a display layer DPL, a touch sensing layer TSL, and a window WDL. The display layer DPL and the touch sensing layer TSL may constitute the display panel 10. The display layer DPL may include a substrate SUB, a thin film transistor layer TFTL disposed on the substrate SUB, a light emitting element layer EML, and an encapsulation layer TFEL.

The substrate SUB may be a rigid substrate, or may be a flexible substrate that may be bent, folded, and/or rolled. The substrate SUB may include (e.g., may be made of) an insulating material, for example, such as glass, quartz, or a polymer material. Examples of the polymer material may include polyethersulphone (PES), polyacrylate (PA), polyarylate (PAR), polyetherimide (PEI), polyethylene naphthalate (PEN), polyethylene terepthalate (PET), polyphenylene sulfide (PPS), polyallylate, polyimide (PI), polycarbonate (PC), and/or combinations thereof.

The thin film transistor layer TFTL may be disposed on the substrate SUB, and may include a plurality of thin film transistors for driving the pixels, and a plurality of display signal lines. The plurality of display signal lines may include scan lines for transferring scan signals to the respective pixels, and data lines for transferring data signals to the respective pixels.

Figure 9:
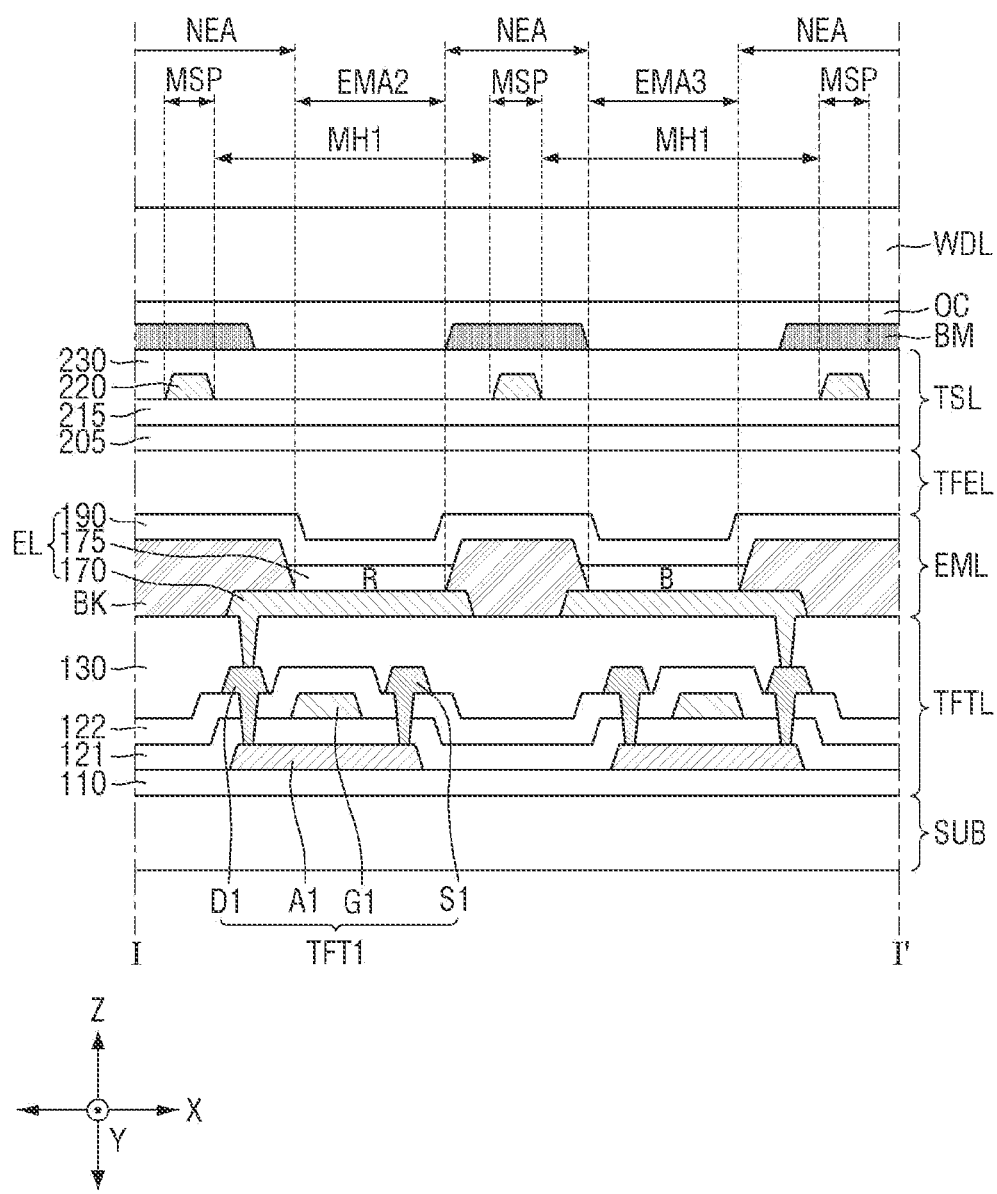
FIG. 9 is a cross-sectional view illustrating an example of the display device taken along the line I-I' of FIG. 8.
Figure 10:
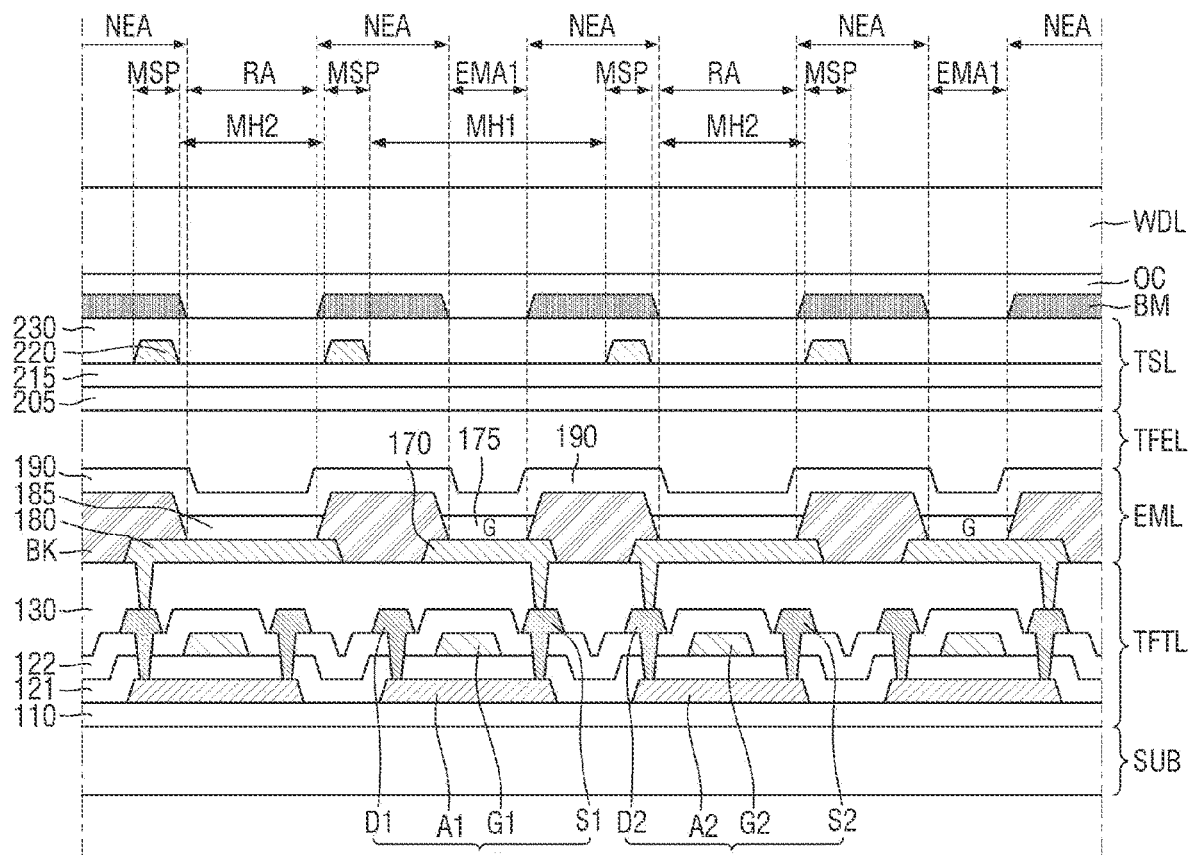
FIG. 10 is a cross-sectional view illustrating an example of the display device taken along the line II-II' of FIG. 8.

The light emitting element layer EML may be disposed on one surface of the thin film transistor layer TFTL, and may include light emitting elements EL (e.g., see FIG. 9) for emitting light, and photoelectric conversion elements PD (e.g., see FIG. 10).

Each of the light emitting elements EL may emit light having a desired or suitable luminance (e.g., having a predetermined luminance) according to an anode voltage and a cathode voltage applied from the thin film transistor layer TFTL.

Each of the light emitting elements EL may include (e.g., may be), for example, an organic light emitting diode including an anode electrode, a cathode electrode, and an organic emission layer disposed between the anode electrode and the cathode electrode. As another example, each of the light emitting elements may include (e.g., may be) an inorganic light emitting element including an anode electrode, a cathode electrode, and an inorganic semiconductor disposed between the anode electrode and the cathode electrode. As another example, each of the light emitting elements may include (e.g., may be) a quantum dot light emitting element including an anode electrode, a cathode electrode, and a quantum dot emission layer disposed between the anode electrode and the cathode electrode. As another example, each of the light emitting elements may include (e.g., may be) a micro light emitting diode.

Each of the photoelectric conversion elements PD may generate photocharges in proportion to incident light. The accumulated photocharges may be converted into electrical signals that are used for sensing according to the anode voltage and the cathode voltage applied from the thin film transistor layer TFTL.

Each of the photoelectric conversion elements PD may include an anode electrode, a cathode electrode, and a photoelectric conversion layer disposed between the anode electrode and the cathode electrode. Each of the photoelectric conversion elements PD may convert light incident from the outside into an electrical signal. The photoelectric conversion element PD may include (e.g., may be), for example, a light receiving diode, or a phototransistor including (e.g., made of) a pn-type or pin-type inorganic material. As another example, the photoelectric conversion element PD may include (e.g., may be) an organic light receiving diode that uses an organic material.

The encapsulation layer TFEL may be disposed on the light emitting element layer EML. The encapsulation layer TFEL may include a stacked film of inorganic films and/or organic films to prevent or substantially prevent moisture and/or oxygen from penetrating into the light emitting elements of the light emitting element layer EML.

The touch sensing layer TSL may be disposed on the encapsulation layer TFEL. The touch sensing layer TSL may include a plurality of touch electrodes IE1 and IE2 and a plurality of signal lines TL and RL (e.g., see FIG. 5) for sensing a user's touch. The touch sensing layer TSL may sense the user's touch as a self-capacitance type or a mutual capacitance type.

The window WDL may be disposed on the touch sensing layer TSL. The window WDL may include a rigid material, for example, such as glass or quartz. The window WDL may include, for example, a window member. The window WDL may be attached onto the touch sensing layer TSL using an optical transparent adhesive or the like.

In some embodiments, a polarizing film for decreasing external light reflection may be additionally disposed between the touch sensing layer TSL and the window WDL.

Figure 3:
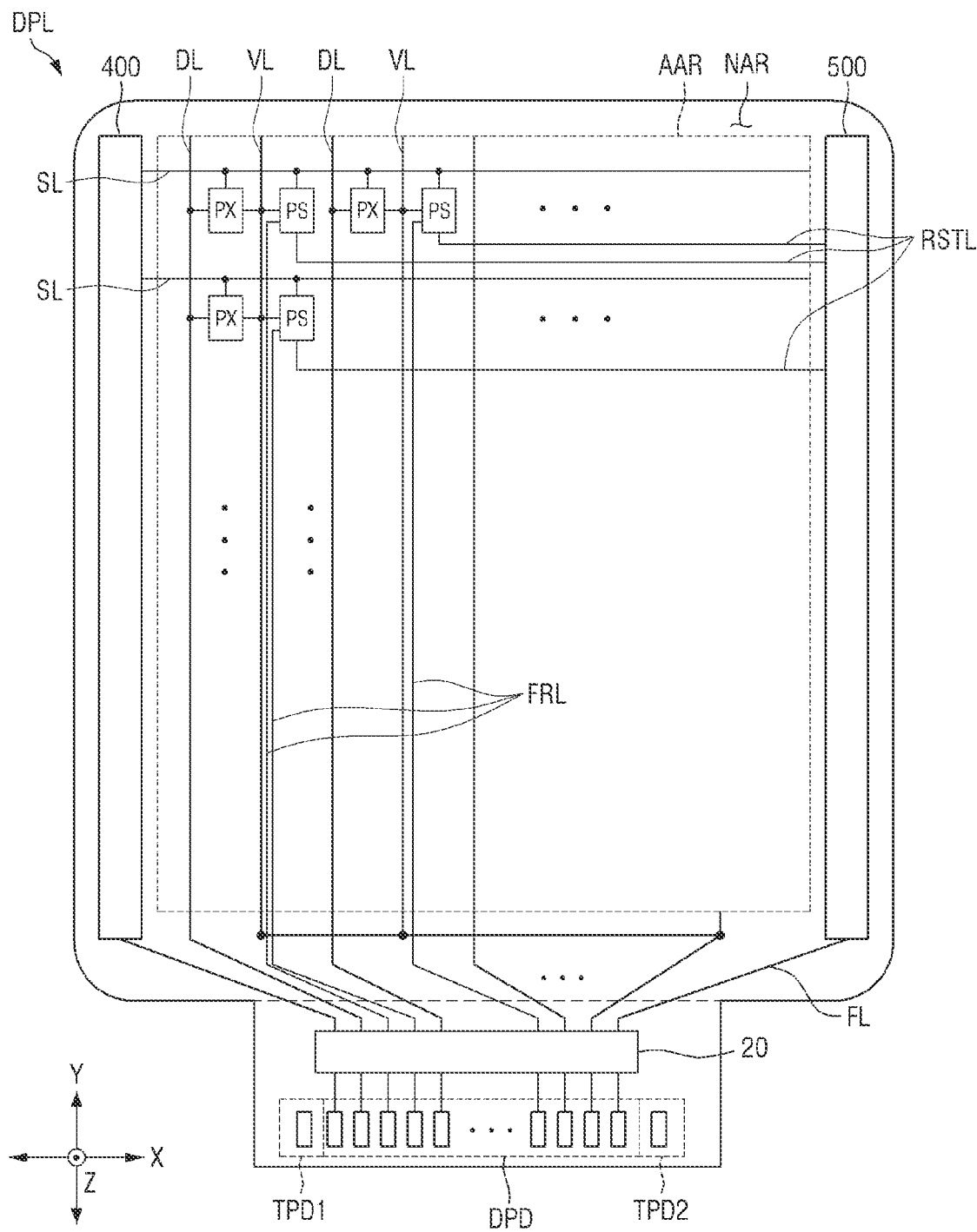
FIG. 3 is a schematic plan layout view of a display layer according to an embodiment.

FIG. 3 is a schematic plan layout view of a display layer according to an embodiment.

Referring to FIG. 3, scan lines SL, source voltage lines VL, data lines DL, reset lines RSTL, and sensing lines FRL may be disposed at (e.g., in or on) the active area AAR of the display layer DPL. The scan lines SL and the source voltage lines VL may be connected to the plurality of pixels PX and the plurality of optical sensors PS. The data lines DL may be connected to the plurality of pixels PX, and the reset lines RSTL and the sensing lines FRL may be connected to the plurality of optical sensors PS.

The scan lines SL may supply scan signals received from a scan driver 400 to the plurality of pixels PX and the plurality of optical sensors PS. The scan lines SL may extend in the first direction X, and may be spaced apart from each other along the second direction Y.

The data lines DL may supply data voltages received from the panel driver 20 to the plurality of pixels PX. The data lines DL may extend in the second direction Y, and may be spaced apart from each other along the first direction X.

The source voltage lines VL may supply a source voltage received from the panel driver 20 to the plurality of pixels PX and the plurality of optical sensors PS. The source voltage may be at least one of a first source voltage ELVDD, a second source voltage ELVSS, and an initialization voltage. The source voltage lines VL may extend in the second direction Y, and may be spaced apart from each other along the first direction X at (e.g., in or on) the active area AAR. The source voltage lines VL may be connected to each other at (e.g., in or on) the non-active area NAR.

The reset lines RSTL may supply reset signals received from a reset signal generator 500 to the plurality of optical sensors PS. The reset lines RSTL may extend in the first direction X, and may be spaced apart from each other along the second direction Y.

The sensing lines FRL may supply currents generated by photocharges of the optical sensors PS to a fingerprint sensing part. The sensing lines FRL may extend in the second direction Y, and may be spaced apart from each other along the first direction X.

The non-active area NAR of the display layer DPL may include the scan driver 400, fan-out lines FL, the reset signal generator 500, and the panel driver 20.

The scan driver 400 may generate a plurality of scan signals based on a scan control signal, and may sequentially supply the plurality of scan signals to the plurality of scan lines SL according to a suitable order (e.g., a set or predetermined order).

The fan-out lines FL may extend from the panel driver 20 to the active area AAR. The fan-out lines FL may supply the data voltages received from the panel driver 20 to the plurality of data lines DL. In addition, the fan-out lines FL may transfer the currents received from the sensing lines FRL to the panel driver 20.

The reset signal generator 500 may generate a plurality of reset signals based on a reset control signal, and may sequentially supply the reset signals to the plurality of reset lines RSTL according to a suitable order (e.g., a set or predetermined order). The optical sensors PS that are connected to the reset lines RSTL may receive the reset signals. However, the present disclosure is not limited thereto, and the reset signal generator 500 may be omitted as needed or desired.

The panel driver 20 may output signals and voltages for driving the display panel 10 to the fan-out lines FL. The panel driver 20 may supply the data voltages to the data lines DL through the fan-out lines FL. The data voltages may be supplied to the plurality of pixels PX, and may determine luminance of the plurality of pixels PX.

In some embodiments, the panel driver 20 may include the fingerprint sensing part. The fingerprint sensing part may measure magnitudes of the currents of the optical sensors PS received through the sensing lines FRL. The fingerprint sensing part may generate fingerprint sensing data according to the magnitudes of the currents sensed by the optical sensors PS, and may transmit the fingerprint sensing data to a main processor. The main processor may determine whether a fingerprint coincides with a user's fingerprint through a comparison with a predetermined or preset fingerprint by analyzing the fingerprint sensing data. As another example, the fingerprint sensing part may be formed as an integrated circuit separate from the panel driver 20.

In addition, the panel driver 20 may supply the scan control signal to the scan driver 400 through a scan control line.

The non-active area NAR of the display layer DPL may further include a display pad part DPD, and first and second touch pad parts TPD1 and TPD2. The display pad part DPD, the first touch pad part TPD1, and the second touch pad part TPD2 may be electrically connected to the circuit board 30 using an anisotropic conductive film or a low-resistance high-reliability material, for example, such as a super absorbent polymer (SAP). The display pad part DPD may include a plurality of display pads.

While FIG. 3 shows, by way of example, that the scan lines SL are concurrently (e.g., simultaneously) connected to the plurality of pixels PX and the plurality of optical sensors PS (e.g., the plurality of pixels PX and the plurality of optical sensors PS are connected to the same scan lines SL), the present disclosure is not limited thereto, and the types and arrangement forms of the signal lines may be variously modified as needed or desired. In various embodiments, the plurality of pixels PX and the plurality of optical sensors PS may be turned on or turned off based on the same or substantially the same scan signal. Accordingly, in various embodiments, a form of a fingerprint may be optically sensed during a period in which a screen is displayed.

Figure 4:
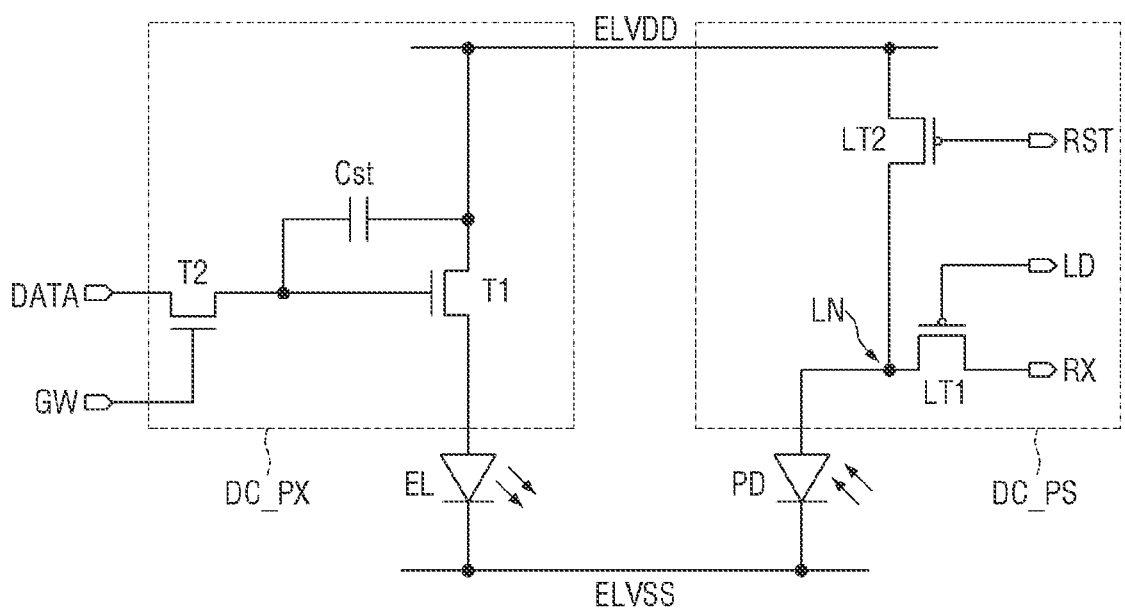
FIG. 4 is a circuit diagram illustrating a pixel and an optical sensor of the display layer according to an embodiment.

FIG. 4 is a circuit diagram illustrating a pixel and an optical sensor of the display layer according to an embodiment.

Referring to FIG. 4, the display panel 10 may include a display driving circuit DC_PX for controlling an amount of light emitted from a corresponding one of the plurality of pixels PX, and a sensing driving circuit DC_PS for controlling an amount of light received by a corresponding one of the plurality of optical sensors PS. The display panel 10 may apply driving signals or driving voltages to one or more transistors included in the display driving circuit DC_PX and the sensing driving circuit DC_PS via various signal lines.

The display driving circuit DC_PX and the sensing driving circuit DC_PS may each be formed as an integrated circuit, or may be integrated as one integrated circuit as illustrated in FIG. 4.

The display driving circuit DC_PX may include a light emitting element EL, a capacitor Cst, a first transistor T1, and a second transistor T2. The display driving circuit DC_PX may receive a data signal DATA, a first scan signal GW, a first source voltage ELVDD, and a second source voltage ELVSS. The data signal DATA may be provided through the panel driver 20 connected to the data line DL, and the first scan signal GW may be provided through the scan driver 400 connected to the scan line SL.

The light emitting element EL may include (e.g., may be), for example, an organic light emitting diode including an anode electrode, a cathode electrode, and an emission layer 175 (e.g., see FIG. 9) disposed between the anode electrode and the cathode electrode. The anode electrode of the light emitting element EL is connected to the first transistor T1. The cathode electrode of the light emitting element EL may be connected to a second source voltage ELVSS terminal to receive the second source voltage ELVSS. The anode electrode of the light emitting element EL may correspond to a pixel electrode 170 (e.g., see FIG. 9), and the cathode electrode of the light emitting element EL may correspond to a common electrode 190.

The capacitor Cst is connected between a gate electrode of the first transistor T1 and a first source voltage ELVDD terminal. The capacitor Cst includes a capacitor first electrode connected to the gate electrode of the first transistor T1, and a capacitor second electrode connected to the first source voltage ELVDD terminal.

The first transistor T1 may be a driving transistor, and the second transistor T2 may be a switching transistor. Each of the first and second transistors T1 and T2 may include a gate electrode, a source electrode, and a drain electrode. One electrode of each of the first and second transistors may be the source electrode, and another electrode of each of the first and second transistors may be the drain electrode. Hereinafter, for convenience of description, a case where the one electrode is the drain electrode and the other electrode is the source electrode will be described in more detail by way of example.

The first transistor T1 may be the driving transistor, and may generate a driving current. The gate electrode of the first transistor T1 is connected to the capacitor first electrode, one electrode of the first transistor T1 is connected to the first source voltage ELVDD terminal, and the other electrode of the first transistor T1 is connected to the anode electrode of the light emitting element EL. The capacitor second electrode is connected to one electrode of the first transistor T1. In a cross sectional view, the first transistor T1 may be a first thin film transistor TFT1 (e.g., see FIG. 9) that is disposed on the thin film transistor layer TFTL and connected to the pixel electrode 170.

The second transistor T2 is the switching transistor. A gate electrode of the second transistor T2 is connected to a first scan signal GW terminal, one electrode of the second transistor T2 is connected to a data signal DATA terminal, and the other electrode of the second transistor T2 is connected to one electrode of the first transistor T1. The second transistor T2 may be turned on according to the first scan signal GW to perform a switching operation of transferring the data signal DATA to one electrode of the first transistor T1.

The capacitor Cst may be charged with a voltage corresponding to the data signal DATA received from the second transistor T2. The first transistor T1 may control the driving current flowing to the light emitting element EL according to a quantity of charges stored in the capacitor Cst.

However, the present disclosure is not limited thereto, and the display driving circuit DC_PX may have various suitable structures, for example, such as a structure in which the display driving circuit DC_PX further includes a compensation circuit for compensating for a threshold voltage deviation ΔVth of the first transistor T1, or the like.

The sensing driving circuit DC_PS may include a sensing transistor LT1, a reset transistor LT2, and a photoelectric conversion element PD. In addition, the sensing driving circuit DC_PS may further include a sensing node LN between the sensing transistor LT1, the reset transistor LT2, and the photoelectric conversion element PD. The sensing driving circuit DC_PS may receive a fingerprint scan signal LD, a fingerprint sensing signal RX, and a reset signal RST. The fingerprint scan signal LD may be provided through the scan driver 400 connected to the scan line SL, but the present disclosure is not limited thereto. The fingerprint sensing signal RX may be provided through the panel driver 20 (or the fingerprint sensing part) connected to the sensing line FRL. The reset signal RST may be provided through the reset signal generator 500 connected to the reset signal line RSTL.

The photoelectric conversion element PD may be an organic light emitting diode or a phototransistor including an anode electrode, a cathode electrode, and a photoelectric conversion layer 185 (e.g., see FIG. 10) disposed between the anode electrode and the cathode electrode. The anode electrode of the photoelectric conversion element PD is connected to the sensing node LN. The cathode electrode of the photoelectric conversion element PD may be connected to the second source voltage ELVSS terminal to receive the second source voltage ELVSS. The anode electrode of the photoelectric conversion element PD may correspond to a first electrode 180 (e.g., see FIG. 10), and the cathode electrode of the photoelectric conversion element PD may correspond to a common electrode 190.

The photoelectric conversion element PD may generate photocharges when exposed to external light, and the generated photocharges may be accumulated in the anode electrode of the photoelectric conversion element PD. In this case, a voltage of the sensing node LN electrically connected to the anode electrode may be boosted. When a fingerprint sensing signal RX terminal is connected to the photoelectric conversion element PD, a current may flow due to a voltage difference between the sensing node LN in which charges are accumulated and the sensing line FRL.

The sensing transistor LT1 may include a gate electrode connected to a fingerprint scan signal LD terminal, one electrode connected to the sensing node LN, and the other electrode connected to the fingerprint sensing signal RX terminal. The sensing transistor LT1 may be turned on according to the fingerprint scan signal LD to transfer a current flowing through the photoelectric conversion element PD to the fingerprint sensing signal RX terminal. The sensing transistor LT1 may be a second thin film transistor TFT2 of the thin film transistor layer TFTL, as illustrated in FIG. 10.

The reset transistor LT2 may include a gate electrode connected to a reset signal RST terminal, one electrode connected to the first source voltage ELVDD terminal, and the other electrode connected to the sensing node LN. In this case, the sensing node LN and the anode electrode of the photoelectric conversion element PD may be reset to the first source voltage ELVDD.

While FIG. 4 shows that each of the transistors is an N-channel metal oxide semiconductor (NMOS) transistor, the present disclosure is not limited thereto, and some or all of the transistors may be provided as P-channel metal oxide semiconductor (PMOS) transistors.

Figure 5:
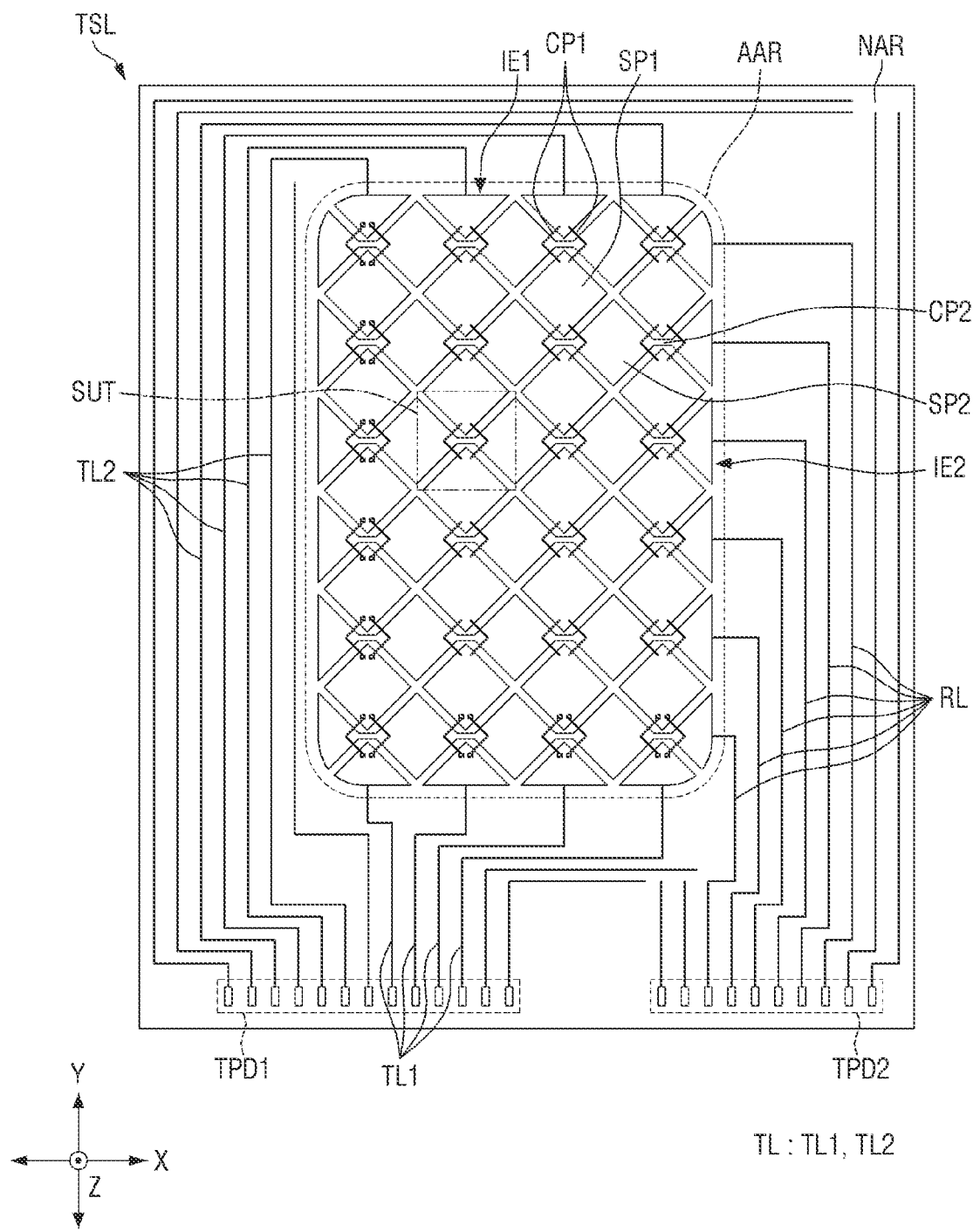
FIG. 5 is a schematic plan layout view of a touch sensing layer of a display panel according to an embodiment.

FIG. 5 is a schematic plan layout view of a touch sensing layer of a display panel according to an embodiment.

Referring to FIG. 5, the touch sensing layer TSL includes an active area AAR and a non-active area NAR. The active area AAR may be a touch sensing area for sensing a user's touch, and the non-active area NAR may be a touch peripheral area disposed around (e.g., adjacent to) the touch sensing area. For example, the non-active area NAR may surround (e.g., around a periphery of) the active area AAR. The touch sensing area may overlap with the display area and the light sensing area of the display layer DPL described above, and the touch peripheral area may overlap with the non-display area of the display layer DPL described above.

The active area AAR may include a plurality of first touch electrodes IE1 and a plurality of second touch electrodes IE2. One of the first and second touch electrodes IE1 and IE2 may be driving electrodes, and the other of the first and second touch electrodes IE1 and IE2 may be sensing electrodes. In the present embodiment, a case where the first touch electrodes IE1 are the driving electrodes and the second touch electrodes IE2 are the sensing electrodes will be described in more detail by way of example.

The first touch electrode IE1 may extend in the second direction Y. The first touch electrode IE1 may include a plurality of first sensor parts SP1 arranged along the second direction Y, and a first connection part CP1 electrically connecting adjacent ones of the first sensor parts SP1 to each other. The plurality of first touch electrodes IE1 may be arranged along the first direction X.

The second touch electrode IE2 may extend in the first direction X. The second sensing electrode IE2 may include a plurality of second sensor parts SP2 arranged along the first direction X, and a second connection part CP2 electrically connecting adjacent ones of the second sensor parts SP2 to each other. The plurality of second touch electrodes IE2 may be arranged along the second direction Y.

Figure 6:
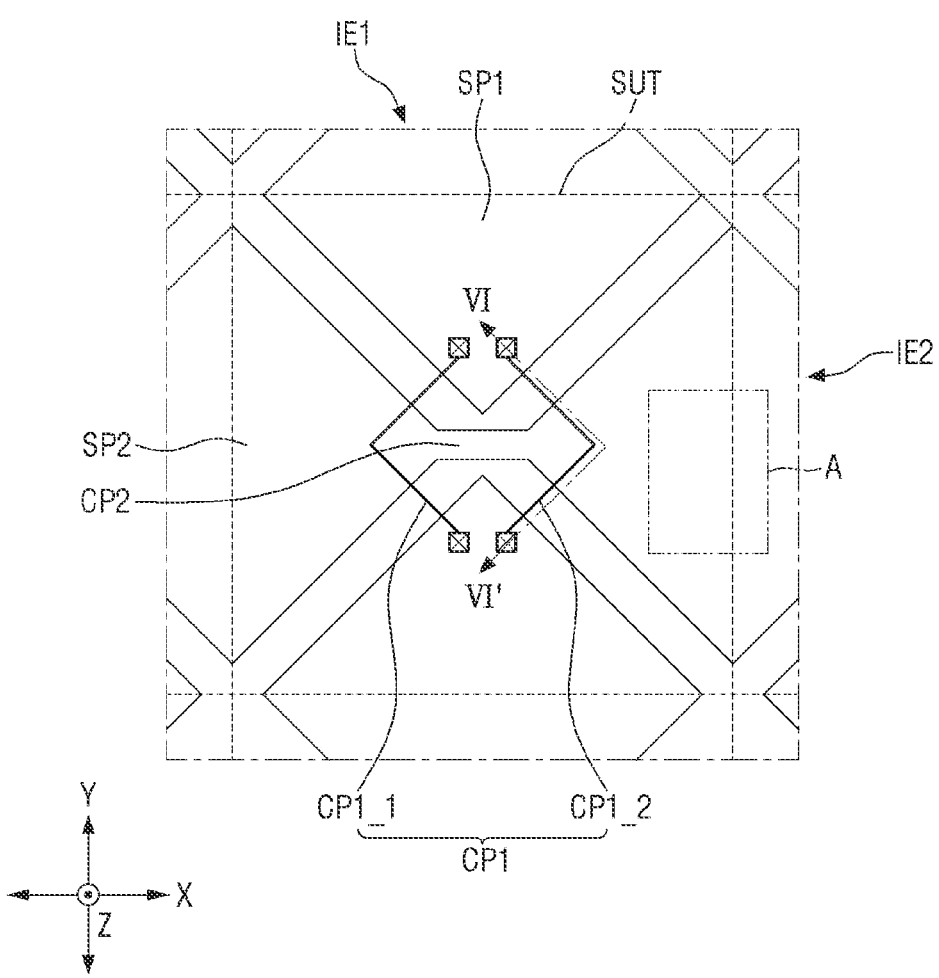
FIG. 6 is a partially enlarged view illustrating a unit sensing area of FIG. 5.

FIG. 6 is a partially enlarged view illustrating a unit sensing area of FIG. 5.

Referring to FIGS. 5 and 6, at least some of the first sensor parts SP1 and the second sensor parts SP2 may have a rhombic shape. Some of the first sensor parts SP1 and the second sensor parts SP2 may have a figure shape cut from a rhombus shape. For example, each of the first sensor parts SP1 and the second sensor parts SP2 positioned at opposite end portions in an extension direction may have a triangular shape obtained by cutting a rhombus shape in half. The first sensor parts SP1 having the rhombic or triangular shape and the second sensor parts SP2 having the rhombic or triangular shape may have the same or substantially the same size and shape as each other. However, the present disclosure is not limited thereto, and the shapes and the sizes of the first sensor part SP1 and the second sensor part SP2 may be variously modified as needed or desired.

The first connection part CP1 may include a first connecting portion CP1_1 and a second connecting portion CP1_2 to connect rhombic or triangular corner portions of neighboring (e.g., adjacent ones of the) first sensor parts SP1 to each other. The second connection part CP2 may connect rhombic or triangular corner portions of neighboring (e.g., adjacent ones of the) second sensor parts SP2 to each other. Widths of the first connection part CP1 and the second connection part CP2 may be smaller than those of the first sensor part SP1 and the second sensor part SP2.

The first touch electrode IE1 and the second touch electrode IE2 may cross each other, and may be insulated from each other. Insulation between the first touch electrode IE1 and the second touch electrode IE2 may be secured by connecting the first sensor parts SP1 of the first touch electrode IE1 to each other and the second sensor parts SP2 of the second touch electrode IE2 to each other through conductive layers positioned at (e.g., in or on) different layers in an area in which the first touch electrode IE1 and the second touch electrode IE2 cross each other. The crossing of the first touch electrode IE1 and the second touch electrode IE2 may be made by the first connection part CP1 and/or the second connection part CP2. At least one of the first connection part CP1 and the second connection part CP2 may be positioned at (e.g., in or on) a different layer from those of the first touch electrode IE1 and the second touch electrode IE2 for insulation crossing. A stacked structure of the touch sensing layer TSL will be described in more detail below with reference to FIG. 7.

The first sensor parts SP1 and the second sensor parts SP2 that are adjacent to each other may constitute a unit sensing area SUT. For example, halves of two adjacent first sensor parts SP1 and halves of two adjacent second sensor parts SP2 around (e.g., adjacent to or surrounding around a periphery of) an area in which the first touch electrode IE1 and the second touch electrode IE2 cross each other may constitute a single square or rectangle. As described above, an area defined by half areas of the two adjacent first and second sensor parts SP1 and SP2 may define (e.g., may be) one unit sensing area SUT. A plurality of unit sensing areas SUT may be arranged in a matrix form.

Each of the unit sensing areas SUT may be used to determine whether or not a touch input has been made, and a touch input position may be calculated as touch input coordinates by measuring capacitance values between the adjacent first sensor parts SP1 and second sensor parts SP2. The touch sensing may be performed in a mutual capacitance manner, but the present disclosure is not limited thereto.

Each unit sensing area SUT may have a greater size than that of the pixel. For example, the unit sensing area SUT may correspond to a plurality of pixels. A length of one side of the unit sensing area SUT may be in the range of 4 to 5 mm, but the present disclosure is not limited thereto.

Referring to FIG. 5, a plurality of touch signal lines are disposed at (e.g., in or on) the non-active area NAR. The touch signal lines extend from the first and second touch pad parts TPD1 and TPD2 to the non-active area NAR.

The plurality of touch signal lines include a plurality of touch driving lines TL and a plurality of touch sensing lines RL. The plurality of touch signal lines may further include touch ground lines and/or touch anti-static lines.

The touch driving lines TL may be connected to the first touch electrodes IE1. In an embodiment, a plurality of touch driving lines may be connected to one first touch electrode IE1. For example, the touch driving lines TL may include first touch driving lines TL1 connected to lower end portions of the first touch electrodes IE1, and second touch driving lines TL2 connected to upper end portions of the first touch electrodes IE1. The first touch driving lines TL1 may extend from the first touch pad part TPD1 to one side of the active area AAR in the second direction Y, and may be connected to the lower end portions of the first touch electrodes IE1. The second touch driving lines TL2 may extend from the first touch pad part TPD1 to another side of the active area AAR in the second direction Y, by bypassing a left edge of the active area AAR (or the touch sensing area), and may be connected to the upper end portions of the first touch electrodes IE1.

The touch sensing lines RL may be connected to the second touch electrodes IE2. In an embodiment, one touch sensing line RL may be connected to one second touch electrode IE2. The touch sensing lines RL may extend from the second touch pad part TPD2 toward one side of the active area AAR in the second direction Y, may extend toward a right edge side of the active area AAR (or the touch sensing area), and may be connected to right end portions of the second touch electrodes IE2, respectively.

When the first touch electrode IE1 and the second touch electrode IE2 are driven in a mutual capacitance manner, a driving signal may be supplied to the first touch electrode IE1 through the first and second touch driving lines TL1 and TL2 to charge a capacitance formed in the unit sensing area SUT. Thereafter, a change in capacitance of the second touch electrode IE2 may be measured through the touch sensing line RL to determine whether or not a touch input has been made.

Figure 7:
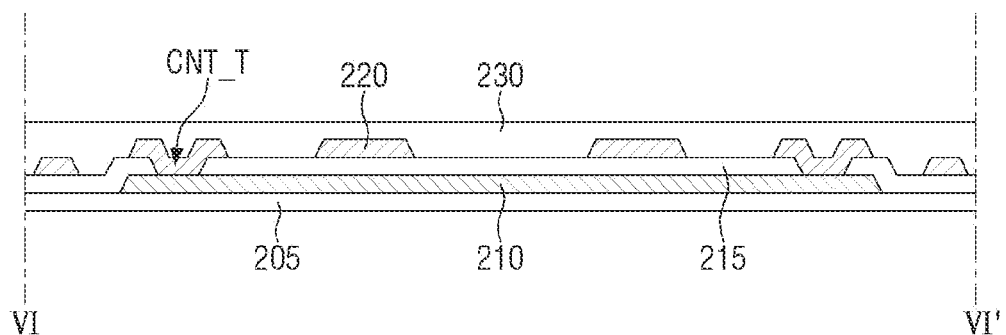
FIG. 7 is a cross-sectional view taken along the line VI-VI' of FIG. 6.

FIG. 7 is a cross-sectional view taken along the line VI-VI' of FIG. 6.

Referring to FIGS. 6 and 7, the touch sensing layer TSL may include a base layer 205, a first touch conductive layer 210 disposed on the base layer 205, a first touch insulating layer 215 disposed on the first touch conductive layer 210, a second touch conductive layer 220 disposed on the first touch insulating layer 215, and a second touch insulating layer 230 covering the second touch conductive layer 220.

In more detail, the first touch conductive layer 210 is disposed on the base layer 205. The first touch conductive layer 210 is covered by the first touch insulating layer 215. The first touch insulating layer 215 insulates the first touch conductive layer 210 and the second touch conductive layer 220 from each other. The second touch conductive layer 220 is disposed on the first touch insulating layer 215. The second touch insulating layer 230 may cover and protect the second touch conductive layer 220.

The base layer 205 may include an inorganic insulating material. For example, the base layer 205 may include a silicon nitride layer, a silicon oxynitride layer, a silicon oxide layer, a titanium oxide layer, an aluminum oxide layer, or the like. The base layer 205 may also include (e.g., may be) an inorganic film constituting a thin film encapsulation layer, which will be described in more detail below.

In an embodiment, the first connection part CP1 may be formed of the first touch conductive layer 210, and the first sensor part SP1, the second sensor part SP2, and the second connection part CP2 may be formed of the second touch conductive layer 220 with the first touch insulating layer 215 interposed between the first touch conductive layer 210 and the second touch conductive layer 220. Accordingly, mutual insulation between the first touch electrode IE1 and the second touch electrode IE2 may be secured at a portion where the first touch electrode IE1 and the second touch electrode IE2 cross each other. However, the present disclosure is not limited thereto. For example, in some embodiments, the second connection part CP2 may be formed of the first touch conductive layer 210, and the first sensor part SP1, the first connection part CP1, and the second sensor part SP2 may be formed of the second touch conductive layer 220.

Each of the first sensor part SP1 of the first touch electrode IE1 and the second sensor part SP2 of the second touch electrode IE2 may be formed in a planar pattern or a mesh pattern.

When each of the first sensor part SP1 and the second sensor part SP2 is formed in the planar pattern, the second touch conductive layer 220 constituting the first sensor part SP1 and the second sensor part SP2 may be formed as a transparent conductive layer.

When each of the first sensor part SP1 and the second sensor part SP2 is formed in the mesh pattern, the first touch conductive layer 210 and the second touch conductive layer 220 may include (e.g., may be made of) a low-resistance material, for example, such as aluminum (Al), molybdenum (Mo), gold (Au), titanium (Ti), nickel (Ni), and/or copper (Cu).

In the present embodiment, a case where each of the first sensor part SP1 and the second sensor part SP2 is formed in the mesh pattern will be described in more detail by way of example. In this case, the formation of a parasitic capacitance between the first and second touch electrodes IE1 and IE2 and a common electrode 190 disposed below the first and second touch electrodes IE1 and IE2 may be reduced.

The first touch insulating layer 215 and the second touch insulating layer 230 may include an inorganic insulating material or an organic insulating material. In an embodiment, one of the first touch insulating layer 215 and the second touch insulating layer 230 may include an inorganic material, and the other of the first touch insulating layer 215 and the second touch insulating layer 230 may include an organic material.

The first touch insulating layer 215 may include a contact hole CNT_T. The first touch conductive layer 210 (e.g., the first connection part CP1) and a part (e.g., the first sensor part SP1) of the second touch conductive layer 220 may be electrically connected to each other through the contact hole CNT_T.

When each of the first sensor part SP1 and the second sensor part SP2 is formed in the mesh pattern, the second touch conductive layer 220 constituting the first sensor part SP1 and the second sensor part SP2 may be disposed on a non-emission area of the display panel. When the second touch conductive layer 220 is disposed on the non-emission area, even though an opaque low-resistance metal is applied as a material of the second touch conductive layer 220, the second touch conductive layer 220 may not hinder light emission, and may not be visually recognized by a user.

Hereinafter, an arrangement of the pixels PX and the optical sensors PS of the display layer DPL, and a relative arrangement relationship of the mesh pattern of the touch sensing layer TSL will be described with reference to FIG. 8 according to an embodiment.

Figure 8:
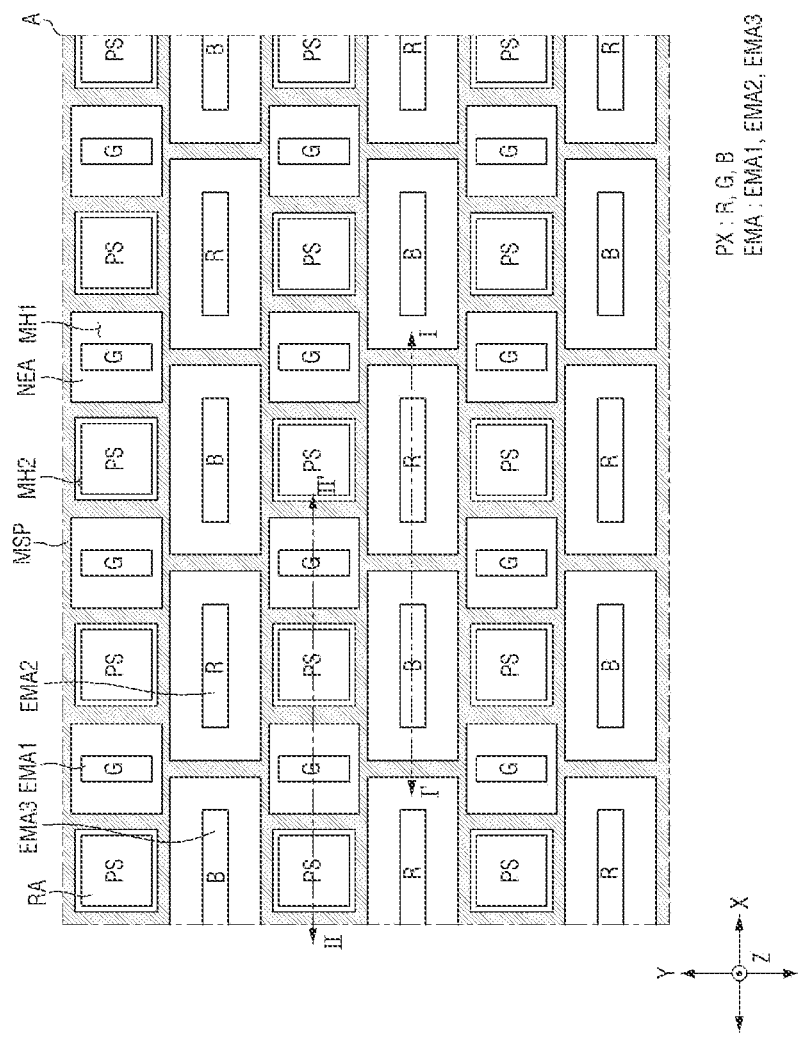
FIG. 8 is an enlarged view illustrating the area A of FIG. 6 in more detail.

FIG. 8 is an enlarged view illustrating the area A of FIG. 6 in more detail.

In FIG. 8, the display layer DPL includes a plurality of pixels PX and a plurality of optical sensors PS.

The plurality of pixels PX may include a plurality of light emitting parts EMA for emitting light at (e.g., in or on) the active area AAR (or the display area). The plurality of light emitting parts EMA may be defined as areas in which the pixel electrode 170 is exposed by openings of a bank layer BK, and areas in which the exposed pixel electrode 170 and an emission layer 175 overlap with each other in a cross-sectional view.

The plurality of optical sensors PS may include a plurality of light sensing parts RA for sensing incident light within the active area AAR (or the light sensing area). The light sensing parts RA may be defined as areas in which the first electrode 180 is exposed by openings of the bank layer BK, and areas in which the exposed first electrode 180 and a photoelectric conversion layer 185 overlap with each other in a cross-sectional view.

A non-emission area is disposed between the light emitting parts EMA of the respective pixels PX. In addition, a non-sensing area is disposed between the light sensing parts RA of the respective optical sensors PS. In the present embodiment, an area where the non-emission area and the non-sensing area overlap with each other will be referred to as a peripheral part NEA. A mesh pattern MSP is disposed at (e.g., in or on) the peripheral part NEA.

The pixel PX may include a green pixel G, a red pixel R, and a blue pixel B. Each colored pixel and each optical sensor PS may be arranged in various suitable manners.

In an embodiment, the green pixels G and the optical sensors PS may be alternately arranged in a first row along the first direction X, and the blue pixels B and the red pixels R may be alternately arranged in a second row adjacent to the first row along the first direction X. Colored pixels belonging to the first row may be disposed to be misaligned with colored pixels belonging to the second row in the first direction X. The number of green pixels G belonging to the first row may be twice the number of red pixels R or blue pixels B belonging to the second row. In addition, the number of optical sensors PS belonging to the first row may be twice the number of red pixels R or blue pixels B belonging to the second row. Arrangements of the first row and the second row may be repeated up to an n-th row, where n is a natural number greater than 1.

Sizes of the light emitting parts EMA of the respective colored pixels may be different from each other. When an emission area of the green pixel G is referred to as a first light emitting part EMA1, an emission area of the red pixel R is referred to as a second light emitting part EMA2, and an emission area of the blue pixel B is referred to as a third light emitting part EMA3, the first light emitting part EMA1 may have a smaller size than the second light emitting part EMA2 and/or the third light emitting part EMA3.

While FIG. 8 shows that the light emitting part EMA of each colored pixel has a rectangular shape, the present disclosure is not limited thereto, and each light emitting part EMA may have any suitable shape, for example, such as an octagonal shape, a circular shape, a rhombic shape, or other suitable polygonal shapes.

The mesh pattern MSP may be disposed along boundaries of the pixels PX and the optical sensors PS at (e.g., in or on) the peripheral part NEA. The mesh pattern MSP may not overlap with the light emitting parts EMA, and may not overlap with the light sensing parts RA. A width of the mesh pattern MSP may be smaller than a width of the peripheral part NEA in one direction.

In an embodiment, mesh holes MH1 and MH2 exposed by the mesh pattern MSP may have a rectangular or substantially rectangular shape, but the present disclosure is not limited thereto. The mesh holes MH1 and MH2 may not overlap with the light emitting parts EMA and the light sensing parts RA. The mesh holes MH1 and MH2 may include first mesh holes MH1 and second mesh holes MH2.

The first mesh holes MH1 may expose the plurality of light emitting parts EMA, respectively. In other words, areas defined as the first mesh holes MH1 may include the light emitting parts EMA. The first mesh holes MH1 may overlap with portions of the emission layer 175 and the bank layer BK of the light emitting parts EMA. Sizes of the first mesh holes MH1 (or widths of the first mesh holes MH1 in a horizontal direction) may be the same or substantially the same as each other, but the present disclosure is not limited thereto, and the sizes of the first mesh holes MH1 may be different from each other depending on the sizes of the light emitting parts EMA exposed by the first mesh holes MH1. For example, the size of the first light emitting part EMA1 may be smaller than that of the second light emitting part EMA2, and thus, a size of the first mesh hole MH1 exposing the first light emitting part EMA1 may be smaller than that of the first mesh hole MH1 exposing the second light emitting part EMA2.

The second mesh holes MH2 may expose the plurality of light sensing parts RA, respectively. In other words, areas defined as the second mesh holes MH2 may include the light sensing parts RA. The second mesh holes MH2 may overlap with portions of the photoelectric conversion layer 185 and the bank layer BK of the light sensing parts RA. Sizes of the second mesh holes MH2 (or widths of the second mesh holes MH2 in a horizontal direction) may be the same or substantially the same as each other, but the present disclosure is not limited thereto, and the sizes of the second mesh holes MH2 may be different from each other depending on the sizes of the light sensing parts RA exposed by the second mesh holes MH2.

The mesh pattern MSP may be disposed to be more adjacent to the light sensing part RA than to the light emitting part EMA. Accordingly, light reflected from a lower surface of the mesh pattern MSP (or the touch electrodes IE1 and IE2) having a constant or substantially constant emission angle from among the light emitted from the first light emitting part EMA1 may not be incident on the light sensing part RA. In this case, the light may be incident on the bank layer BK adjacent to the light sensing part RA.

When the light reflected from the lower surfaces of the touch electrodes IE1 and IE2 is incident on the light sensing part RA, the light may act as noise in a fingerprint sensing signal. In the present embodiment, the mesh pattern MSP is disposed to be more adjacent to the light sensing part RA than to the light emitting part EMA, and thus, noise light may not be incident on the light sensing part RA. Accordingly, the noise of the fingerprint sensing signal may be minimized or reduced, and accuracy of the fingerprint sensing signal provided by light reflected by a fingerprint may be improved.

The mesh pattern MSP may include the plurality of touch electrodes IE1 and IE2. In addition, the mesh holes MH1 and MH2 may exist (e.g., may be formed) between the plurality of touch electrodes IE1 and IE2, and may not overlap with the plurality of touch electrodes IE1 and IE2.

In some embodiments, in a case where the touch sensing layer TSL is formed in a planar pattern, the mesh pattern MSP may be referred to as the touch electrodes IE1 and IE2, and the first mesh hole MH1 and the second mesh hole MH2 may be referred to as a first hole and a second hole, respectively.

FIG. 9 is a cross-sectional view illustrating an example of the display device taken along the line I-I' of FIG. 8, and FIG. 10 is a cross-sectional view illustrating an example of the display device taken along the line II-II' of FIG. 8.

Referring to FIGS. 9 and 10, a buffer layer 110 is disposed on the substrate SUB. The buffer layer 110 may include silicon nitride, silicon oxide, silicon oxynitride, or the like.

A plurality of thin film transistors including a first thin film transistor TFT1 and a second thin film transistor TFT2 may be disposed on the buffer layer 110.

The plurality of thin film transistors TFT1 and TFT2 may respectively include semiconductor layers A1 and A2, gate electrodes G1 and G2, source electrodes S1 and S2, and drain electrodes D1 and D2. A gate insulating layer 121 may be disposed on portions of the semiconductor layers A1 and A2. The gate electrodes G1 and G2 may be disposed on the gate insulating layer 121. An interlayer insulating film 122 may cover each of the semiconductor layers A1 and A2 and each of the gate electrodes G1 and G2. The source electrodes S1 and S2 and the drain electrodes D1 and D2 may be disposed on the interlayer insulating film 122.

The semiconductor layers A1 and A2 may form channels of the first thin film transistor TFT1 and the second thin film transistor TFT2, respectively. The semiconductor layers A1 and A2 may include polycrystalline silicon. In another embodiment, the semiconductor layers A1 and A2 may include single crystal silicon, low-temperature polycrystalline silicon, amorphous silicon, or an oxide semiconductor. The oxide semiconductor may include a binary compound (ABx), a ternary compound (ABxCy), or a quaternary compound (ABxCyDz) containing, for example, indium, zinc, gallium, tin, titanium, aluminum, hafnium (Hf), zirconium (Zr), magnesium (Mg), and/or the like. The semiconductor layers A1 and A2 may include the channel regions, and source regions and drain regions doped with impurities.

The gate insulating layer 121 is disposed on the semiconductor layers A1 and A2. The gate insulating layer 121 electrically insulates a first gate electrode G1 and a first semiconductor layer A1 from each other, and electrically insulates a second gate electrode G2 and a second semiconductor layer A2 from each other. The gate insulating layer 121 may include (e.g., may be made of) an insulating material, for example, such as silicon oxide (SiOx), silicon nitride (SiNx), or a metal oxide.

The first gate electrode G1 of the first thin film transistor TFT1 and the second gate electrode G2 of the second thin film transistor TFT2 are disposed on the gate insulating layer 121. The gate electrodes G1 and G2 may be formed above the channel regions of the semiconductor layers A1 and A2, or in other words, at (e.g., in or on) positions where the gate insulating layer 121 overlaps with the channel regions, respectively.

The interlayer insulating film 122 may be disposed on the gate electrodes G1 and G2. The interlayer insulating film 122 may include an inorganic insulating material, for example, such as silicon oxide (SiOx), silicon nitride (SiNx), silicon oxynitride, hafnium oxide, or aluminum oxide. In addition, in some embodiments, the interlayer insulating film 122 may include a plurality of insulating films, and may further include a conductive layer disposed between the insulating films to form a capacitor second electrode.

The source electrodes S1 and S2 and the drain electrodes D1 and D2 are disposed on the interlayer insulating film 122. A first source electrode S1 of the first thin film transistor TFT1 may be electrically connected to the source region of the first semiconductor layer A1 through a contact hole penetrating through the interlayer insulating film 122 and the gate insulating layer 121. A second source electrode S2 of the second thin film transistor TFT2 may be electrically connected to the source region of the second semiconductor layer A2 through a contact hole penetrating through the interlayer insulating film 122 and the gate insulating layer 121. Each of the source electrodes S1 and S2 and the drain electrodes D1 and D2 may include one or more metals selected from the group consisting of aluminum (Al), molybdenum (Mo), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu).

A planarization layer 130 may be formed on the interlayer insulating film 122 to cover each of the source electrodes S1 and S2 and the drain electrodes D1 and D2. The planarization layer 130 may include (e.g., may be made of) an organic insulating material or the like. The planarization layer 130 may have a flat or substantially flat surface, and may include contact holes exposing any one of the source electrodes S1 and S2 and any one of the drain electrodes D1 and D2.

The light emitting element layer EML may be disposed on the planarization layer 130. The light emitting element layer EML may include a light emitting element EL, a photoelectric conversion element PD, and a bank layer BK. The light emitting element EL may include a pixel electrode 170, an emission layer 175, and a common electrode 190. The photoelectric conversion element PD may include a first electrode 180, a photoelectric conversion layer 185, and a common electrode 190.

The pixel electrode 170 of the light emitting element EL may be disposed on the planarization layer 130. The pixel electrode 170 may be provided for each pixel PX. The pixel electrode 170 may be connected to the first source electrode S1 or the first drain electrode D1 of the first thin film transistor TFT1 through the contact hole penetrating through the planarization layer 130.

The pixel electrode 170 of the light emitting element EL may have a single-layer structure of molybdenum (Mo), titanium (Ti), copper (Cu), or aluminum (Al), or may have a stacked film structure, for example, such as a multilayered structure of ITO/Mg, ITO/MgF, ITO/Ag, or ITO/Ag/ITO including indium-tin-oxide (ITO), indium-zinc-oxide (IZO), zinc oxide (ZnO), or indium oxide ($In_2O_3$), and silver (Ag), magnesium (Mg), aluminum (Al), platinum (Pt), lead (Pb), gold (Au), or nickel (Ni), but the present disclosure is not limited thereto.

The first electrode 180 of the photoelectric conversion element PD may also be disposed on the planarization layer 130. The first electrode 180 may be provided for each optical sensor PS. The first electrode 180 may be connected to the second source electrode S2 or the second drain electrode D2 of the second thin film transistor TFT2 through the contact hole penetrating through the planarization layer 130.

The first electrode 180 of the photoelectric conversion element PD may have a single-layer structure of molybdenum (Mo), titanium (Ti), copper (Cu), or aluminum (Al), or may have a multilayered structure of ITO/Mg, ITO/MgF, ITO/Ag, or ITO/Ag/ITO, but the present disclosure is not limited thereto.

The bank layer BK may be disposed on the pixel electrodes 170 and the first electrodes 180. The bank layer BK may be formed at (e.g., in or on) areas overlapping with the pixel electrodes 170, and may include openings exposing the pixel electrodes 170. Areas in which the exposed pixel electrodes 170 and the emission layers 175 overlap with each other may be defined as the first to third light emitting parts EMA1, EMA2, and EMA3 according to the colored pixels R, G, and B included in each pixel PX.

In addition, the bank layer BK may be formed at (e.g., in or on) areas overlapping with the first electrodes 180, and may include openings exposing the first electrodes 180. The openings exposing the first electrodes 180 may provide spaces in which the photoelectric conversion layers 185 of the corresponding optical sensors PS are formed. Areas in which the exposed first electrodes 180 and the photoelectric conversion layers 185 overlap with each other may be defined as the light sensing parts RA.

The bank layer BK may include an organic insulating material, for example, such as a polyacrylates resin, an epoxy resin, a phenolic resin, a polyamides resin, a polyimides resin, an unsaturated polyesters resin, a polyphenyleneethers resin, a polyphenylenesulfides resin, or benzocyclobutene (BCB). As another example, the bank layer BK may also include an inorganic material such as silicon nitride.

The emission layers 175 may be disposed on the pixel electrodes 170 of the light emitting elements EL exposed by the openings of the bank layer BK. The emission layer 175 may include a high molecular material or a low molecular material, and may emit red, green, or blue light for each of the corresponding colored pixels R, G, and B. The light emitted from the emission layer 175 may contribute to an image display, or may function as a light source incident on the optical sensor PS. For example, a light source having a green wavelength emitted from the first light emitting part EMA1 of the green pixel G may function as a light source incident to the light sensing part RA of the optical sensor PS.

When the emission layer 175 is formed of an organic material, a hole injecting layer (HIL) and a hole transporting layer (HTL) may be disposed at a lower portion of each emission layer 175, and an electron injecting layer (EIL) and an electron transporting layer (ETL) may be stacked at an upper portion of each emission layer 175. Each of these layers may be a single layer or multiple layers including (e.g., made of) an organic material.

The photoelectric conversion layers 185 may be disposed on the first electrodes 180 of the photoelectric conversion elements PD exposed by the openings of the bank layer BK. The photoelectric conversion layer 185 may generate photocharges in proportion to incident light. The incident light may be light emitted from the emission layer 175 and then reflected to enter the photoelectric conversion layer 185, or may be light provided from the outside regardless of the emission layer 175. Charges generated and accumulated in the photoelectric conversion layer 185 may be converted into electrical signals used for sensing.

The photoelectric conversion layer 185 may include an electron donating material and an electron accepting material. The electron donating material may generate donor ions in response to light, and the electron accepting material may generate acceptor ions in response to light. When the photoelectric conversion layer 185 is formed of an organic material, the electron donating material may include a compound, for example, such as subphthalocyanine (SubPc) or dibutylphosphate (DBP), but the present disclosure is not limited thereto. The electron accepting material may include a compound, for example, such as fullerene, a fullerene derivative, or perylene diimide, but the present disclosure is not limited thereto.

As another example, when the photoelectric conversion layer 185 is formed of an inorganic material, the photoelectric conversion element PD may be a pn-type or pin-type phototransistor. For example, the photoelectric conversion layer 185 may have a structure in which an N-type semiconductor layer, an I-type semiconductor layer, and a P-type semiconductor layer are sequentially stacked.

When the photoelectric conversion layer 185 is formed of the organic material, a hole injecting layer (HIL) and a hole transporting layer (HTL) may be disposed at a lower portion of each photoelectric conversion layer 185, and an electron injecting layer (EIL) and an electron transporting layer (ETL) may be stacked at an upper portion of each photoelectric conversion layer 185. Each of these layers may be a single layer or multiple layers including (e.g., made of) an organic material.

The light sensing part RA may be an area for receiving light having the same or substantially the same wavelength as that of the light generated by the first light emitting part EMA1 of the green pixel G that is adjacent to the light sensing part RA that uses such light as a light source, but the present disclosure is not limited thereto.

While it has been described by way of example that the areas in which the emission layer 175 and the photoelectric conversion layer 185 are disposed are the same or substantially the same as those of the light emitting part EMA and the light sensing part RA, respectively, the present disclosure is not limited thereto. For example, in some embodiments, the emission layer 175 may also be disposed to cover the bank layer BK beyond the light emitting part EMA, and the photoelectric conversion layer 185 may also be disposed to cover the bank layer BK beyond the light sensing part RA.

The common electrode 190 may be disposed on the emission layers 175, the photoelectric conversion layers 185, and the bank layer BK. The common electrode 190 may be disposed throughout the plurality of pixels PX and the plurality of optical sensors PS in a suitable form to cover the emission layers 175, the photoelectric conversion layers 185, and the bank layer BK. The common electrode 190 may include a material layer having a small work function, for example, such as Li, Ca, LiF/Ca, LiF/Al, Al, Mg, Ag, Pt, Pd, Ni, Au, Nd, Ir, Cr, BaF, Ba, or any suitable compounds or mixtures thereof (e.g., a mixture of Ag and Mg, or the like). As another example, the common electrode 190 may include a transparent metal oxide, for example, such as indium-tin-oxide (ITO), indium-zinc-oxide (IZO), or zinc oxide (ZnO).

The photoelectric conversion element PD and the light emitting element EL may share the common electrode 190 that is disposed on the photoelectric conversion layer 185 and the emission layer 175 with each other, but the present disclosure is not limited thereto.

The encapsulation layer TFEL may be disposed on the light emitting element layer EML. The encapsulation layer TFEL may include at least one inorganic film to prevent or substantially prevent oxygen and/or moisture from penetrating into each of the emission layer 175 and the photoelectric conversion layer 185. In addition, the encapsulation layer TFEL may include at least one organic film to protect each of the emission layer 175 and the photoelectric conversion layer 185 from foreign materials such as dust. For example, the encapsulation layer TFEL may be formed in a structure in which a first inorganic film, an organic film, and a second inorganic film are sequentially stacked. The first inorganic film and the second inorganic film may be formed as multiple films in which one or more inorganic films of a silicon nitride layer, a silicon oxynitride layer, a silicon oxide layer, a titanium oxide layer, and/or an aluminum oxide layer are alternately stacked. The organic film may be an organic film including (e.g., made of) an acryl resin, an epoxy resin, a phenolic resin, a polyamide resin, a polyimide resin, or the like.

The base layer 205, the first touch insulating layer 215, the second touch conductive layer 220, and the second touch insulating layer 230 of the touch sensing layer TSL may be sequentially disposed on the encapsulation layer TFEL. FIGS. 9 and 10 illustrate cross-sectional views of the sensor part, and thus, the first touch conductive layer 210 is not illustrated in these cross-sectional views. An arrangement of the first touch conductive layer 210 including the first connection part CP1 may be the same or substantially the same as that of the second touch conductive layer 220, and thus, redundant description thereof may not be repeated.

The second touch conductive layer 220 may be disposed to overlap with the bank layer BK, and may be disposed at (e.g., in or on) the peripheral part NEA. The second touch conductive layer 220 may constitute the mesh pattern MSP of the touch electrodes IE1 and IE2, and may not overlap with the light emitting part EMA and the light sensing part RA. Accordingly, the second touch conductive layer 220 may not hinder light emission, and may not be visually recognized by the user. In addition, the second touch conductive layer 220 may not be disposed at (e.g., in or on) the first mesh hole MH1 and the second mesh hole MH2.

The first mesh hole MH1 and the second mesh hole MH2 may overlap with the bank layer BK at (e.g., in or on) the peripheral part NEA. The first mesh hole MH1 may overlap with the light emitting part EMA, and the second mesh hole MH2 may overlap with the light sensing part RA.

In the present embodiment, a width in the horizontal direction of a portion of the bank layer BK overlapping with the first mesh hole MH1 may be greater than a width in the horizontal direction of a portion of the bank layer BK overlapping with the second mesh hole MH2. The width in the horizontal direction of the portion of the bank layer BK overlapping with the first mesh hole MH1 may be referred to as a second distance D2 shown in FIG. 11, and the width in the horizontal direction of the portion of the bank layer BK overlapping with the second mesh hole MH2 may be referred to as a first distance D1 shown in FIG. 11.

In addition, the mesh pattern MSP may be disposed to be more adjacent to the light sensing part RA than to the light emitting part EMA. In other words, a distance between the mesh pattern MSP and the light sensing part RA in a plan view may be smaller than a distance between the mesh pattern MSP and the light emitting part EMA in a plan view.

A light blocking member BM may be disposed on the touch sensing layer TSL. The light blocking member BM may include (e.g., may be made of) a suitable material for blocking light emitted from the light emitting part EMA. The light blocking member BM may form a black matrix using a material for absorbing visible light, for example, such as a metal material, or a resin material including a pigment (e.g., carbon black) or a dye. As another example, the light blocking member BM may have a stacked structure of a red color filter, a green color filter, and a blue color filter. Accordingly, the light blocking member BM may prevent or substantially prevent color mixing between the colored pixels included in the pixels PX.

The light blocking member BM may be covered by an overcoat layer OC. The overcoat layer OC may include (e.g., may be) a material having excellent light transmittance. The overcoat layer OC may planarize or substantially planarize an upper portion of the light blocking member BM. The overcoat layer OC may include (e.g., may be made of) an acrylic epoxy material, but the present disclosure is not limited thereto.

In addition, in some embodiments, the light blocking member BM may be covered by a color filter.

The window WDL may be disposed on the overcoat layer OC. The window WDL may be a protective member that is disposed on the overcoat layer OC to protect the components of the display device 1. The window WDL may include (e.g., may be made of) glass or plastic. When the window WDL includes (e.g., is made of) glass, the window WDL may include (e.g., may be made of) ultra-thin glass (UTG) having a thickness of 0.1 mm or less in order to have flexible properties. In addition, in some embodiments, a polarizing plate and a transparent adhesive member may be disposed between the window WDL and the overcoat layer OC.

As described in more detail below, in the present embodiment, even though a separate light blocking member may not be disposed between the touch sensing layer TSL and the encapsulation layer TFEL, noise light reflected by the touch sensing layer TSL that may be incident on the optical sensor PS may be minimized or reduced. In this case, because a process of disposing the light blocking member may be omitted, processing costs may be reduced, and manufacturing processes may be simplified.

Figure 11:
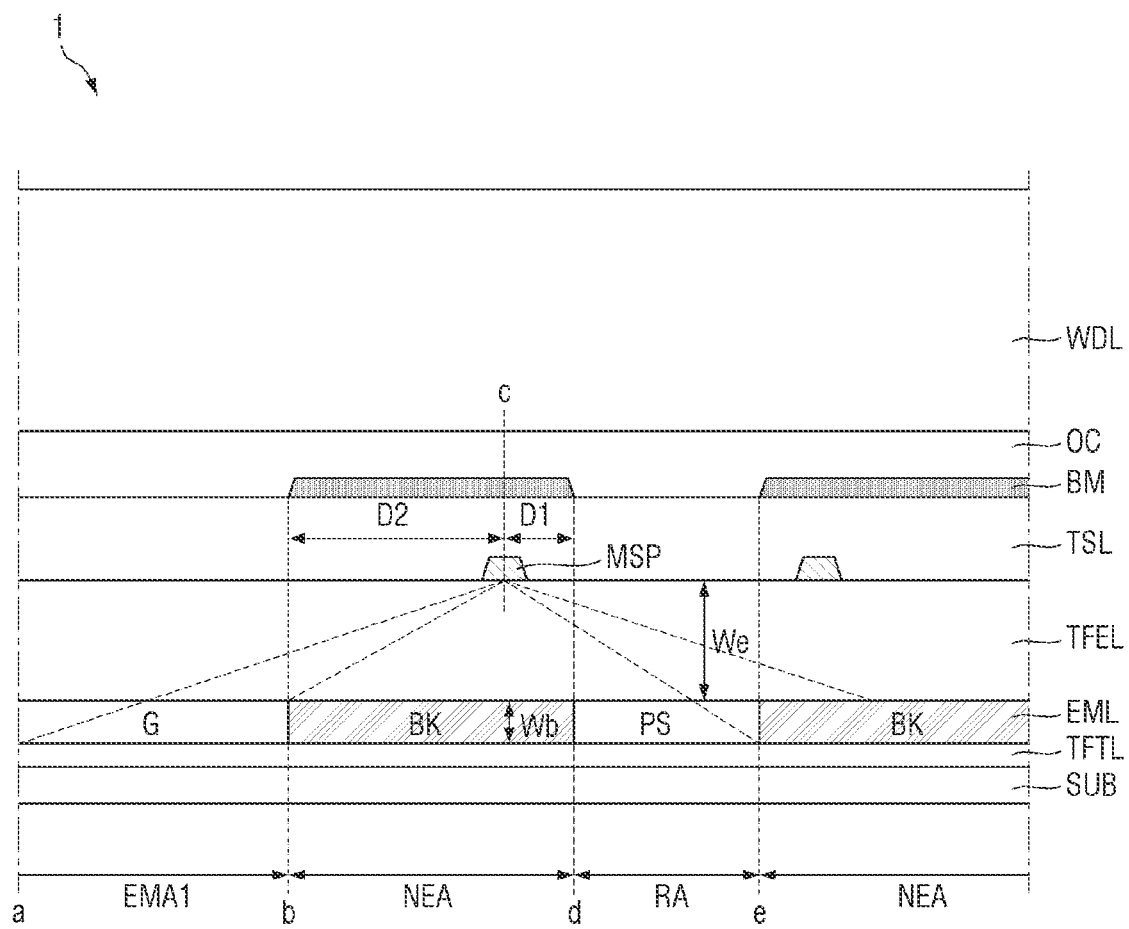
FIG. 11 is a schematic cross-sectional view illustrating an example of the display device corresponding to FIG. 10.
Figure 12:
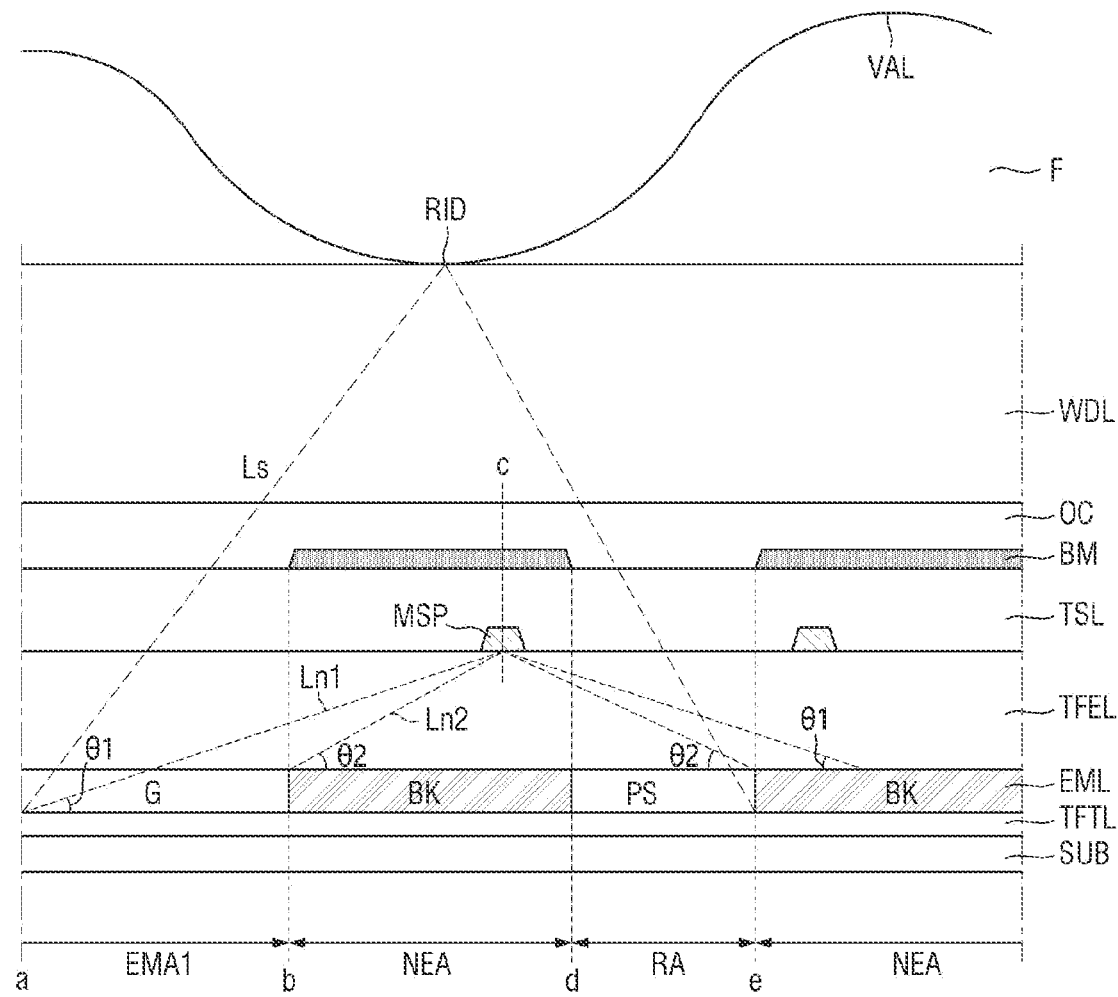
FIG. 12 is a cross-sectional view of the display device in FIG. 11 in which incident light is reflected.

FIG. 11 is a schematic cross-sectional view illustrating an example of the display device corresponding to FIG. 10, and FIG. 12 is a cross-sectional view of the display device in FIG. 11 in which incident light is reflected. In FIGS. 11 and 12, for convenience of illustration, schematic cross-sectional views of one green pixel G (or one first light emitting part EMA1) and one optical sensor PS (or one light sensing part RA) are illustrated.

Light Ls contributing to a fingerprint sensing signal, and light Ln1 and Ln2 acting as noise when a distance D1 between the mesh pattern MSP constituting the touch electrodes IE1 and IE2 and the light sensing part RA is different from a distance D2 between the mesh pattern MSP and the first light emitting part EMA1, will be described with reference to FIGS. 11 and 12.

An end portion of the first light emitting part EMA1 that is farthest from the mesh pattern MSP adjacent to the first light emitting part EMA1 is referred to as one end (a) of the first light emitting part EMA1, and another end portion of the first light emitting part EMA1 that is closest to the mesh pattern MSP is referred to as another end (b) of the first light emitting part EMA1.

In addition, an end portion of the light sensing part RA that is closest to the mesh pattern MSP adjacent to the light sensing part RA is referred to as one end (d) of the light sensing part RA, and another end portion of the light sensing part RA that is farthest to the mesh pattern MSP is referred to as another end (e) of the light sensing part RA.

A distance from the one end (a) of the first light emitting part EMA1 to the other end (b) of the first light emitting part EMA1 may correspond to (e.g., may be) a width in a horizontal direction of the first light emitting part EMA1. A distance from the one end (d) of the light sensing part RA to the other end (e) of the light sensing part RA may correspond to (e.g., may be) a width in the horizontal direction of the light sensing part RA. The horizontal direction refers to the first direction X or the second direction Y.

The first distance D1, which is the distance between the mesh pattern MSP and the light sensing part RA in a plan view, may be smaller than the second distance D2, which is the distance between the mesh pattern MSP and the first light emitting part EMA1 in a plan view.

While the first distance D1 may be described as a distance between the one end (d) of the light sensing part RA and a center (c) of the mesh pattern MSP in a plan view, as another example, the first distance D1 may be described as a distance between the other end (e) of the light sensing part RA and the center c of the mesh pattern MSP in a plan view. As another example, the first distance D1 may be a distance between the one end (d) of the light sensing part RA and one end of the mesh pattern MSP.

While the second distance D2 may be described as a distance between the other end (b) of the first light emitting part EMA1 and the center c of the mesh pattern MSP in a plan view, as another example, the second distance D2 may be described as a distance between the one end (a) of the first light emitting part EMA1 and the center c of the mesh pattern MSP in a plan view. As another example, the second distance D2 may be a distance between the other end (b) of the first light emitting part EMA1 and one end of the mesh pattern MSP.

A width of the bank layer BK may be a distance between the other end (b) of the first light emitting part EMA1 and the one end (d) of the light sensing part RA, and a thickness Wb of the bank layer BK may be a thickness, in the third direction Z of the bank layer BK disposed at (e.g., in or on) the light emitting element layer EML. In addition, a thickness We of the encapsulation layer TFEL may be a distance from an upper surface of the common electrode 190 of the light emitting element layer EML to a lower surface of the base layer 205 of the touch sensing layer TSL in the third direction Z.

Referring to FIG. 12, a fingerprint F of a finger includes ridges RID having a predetermined pattern (e.g., a specific pattern), and valleys VAL between the ridges RID. In a state in which the fingerprint F is in contact with an upper surface of the window WDL, a ridge RID portion of the fingerprint F may be in contact with the upper surface of the window WDL, and a valley VAL portion of the fingerprint F may not be in contact with the window WDL. In other words, the upper surface of the window WDL may be spaced apart from the valley VAL portion of the fingerprint F, such that the upper surface of the window WDL may be in contact with air in the valley VAL portion of the fingerprint F.

When the fingerprint F is in contact with the upper surface of the window WDL, light output from the light emitting part EMA of the pixel PX may be reflected from the ridge RID and the valley VAL of the fingerprint F. In this case, a refractive index of the fingerprint F and a refractive index of air are different from each other, and thus, an amount of light reflected from the ridge RID of the fingerprint F and an amount of light reflected from the valley VAL of the fingerprint F may be different from each other. Accordingly, the ridge RID portion and the valley VAL portion of the fingerprint F may be derived based on a difference between the amounts of the reflected light, or in other words, the light incident on the light sensing part RA of the optical sensor PS. Because the optical sensor PS outputs an electrical signal according to the difference between the amounts of light (or a photocurrent), a pattern of the fingerprint F of the finger may be identified.

The light Ls reflected from the fingerprint F from among the light Ls, Ln1, and Ln2 output from the light emitting part EMA may be output as a fingerprint sensing signal for identifying the pattern of the fingerprint F of the finger. On the other hand, the light Ln1 and Ln2 reflected by a lower surface of the mesh pattern MSP constituting the touch electrodes IE1 and IE2 of the touch sensing layer TSL from among the light Ls, Ln1, and Ln2 output from the light emitting part EMA may be recognized as noise of the fingerprint sensing signal. In other words, as a ratio of the light Ls reflected from the fingerprint F becomes greater than a ratio of the noise light, accuracy of the fingerprint sensing signal may be increased. Therefore, in order to accurately sense the fingerprint sensing signal, it may be desired to prevent or substantially prevent the light reflected from the lower surface of the mesh pattern from being incident on the light sensing part.

FIG. 12 shows that the light Ln1 and Ln2 acting as noise signals of the optical sensor PS may have a first emission angle θ1 to a second emission angle θ2.

The first emission angle θ1 refers to a minimum angle that the light reflected from the lower surface of the mesh pattern MSP from among the light emitted from the first light emitting part EMA1 may have. The first emission angle θ1 may be an angle formed by the center c of the mesh pattern MSP at the one end (a) of the first light emitting part EMA1. The second emission angle θ2 refers to a maximum angle that the light reflected from the lower surface of the mesh pattern MSP from among the light emitted from the first light emitting part EMA1 may have. The second emission angle θ2 may be an angle formed by the center c of the mesh pattern MSP at the other end (b) of the first light emitting part EMA1. The first emission angle θ1 may be smaller than the second emission angle θ2.

The light Ln1 having the first emission angle θ1 from among the light emitted from the first light emitting part EMA1 may be reflected from the lower surface of the mesh pattern MSP, but may not be incident on the light sensing part RA. For example, the light Ln1 may be incident on an adjacent bank layer BK instead of the light sensing part RA. In addition, the light Ln2 having the second emission angle θ2 from among the light emitted from the first light emitting part EMA1 may be reflected from the lower surface of the mesh pattern MSP, but may not be incident on the light sensing part RA. For example, the light Ln2 may be incident on the adjacent bank layer BK.

In other words, the light reflected from the lower surface of the mesh pattern MSP from among the light emitted from the first light emitting part EMA1 may not be incident on the light sensing part RA. Instead, the light may be incident on the bank layer BK that is adjacent to the light sensing part RA. Because the light acting as the noise signals of the optical sensor PS may not be incident on the optical sensor PS, accuracy of the fingerprint sensing signal may be increased. Accordingly, the pattern of the fingerprint F of the finger may be more accurately identified.

For example, as described in more detail below with reference to FIGS. 14 to 17, a ratio of a width of the light sensing part RA to the first distance D1 may be greater than 2.2 and smaller than 3.5.

In the present embodiment, the mesh pattern MSP constituting the touch electrodes IE1 and IE2 may be disposed to be more adjacent to the light sensing part RA than to the light emitting part EMA, and thus, a ratio of the noise lights reflected from the inside of the display device 1 that may be incident on the light sensing part may be minimized or reduced. In other words, interference due to light emission of adjacent pixels PX may be prevented or reduced.

In addition, because the light reflected by the mesh pattern MSP may be incident on only the bank layer BK, a blocking member for blocking such light may not be separately disposed. Therefore, processing costs may be reduced.

Figure 13:
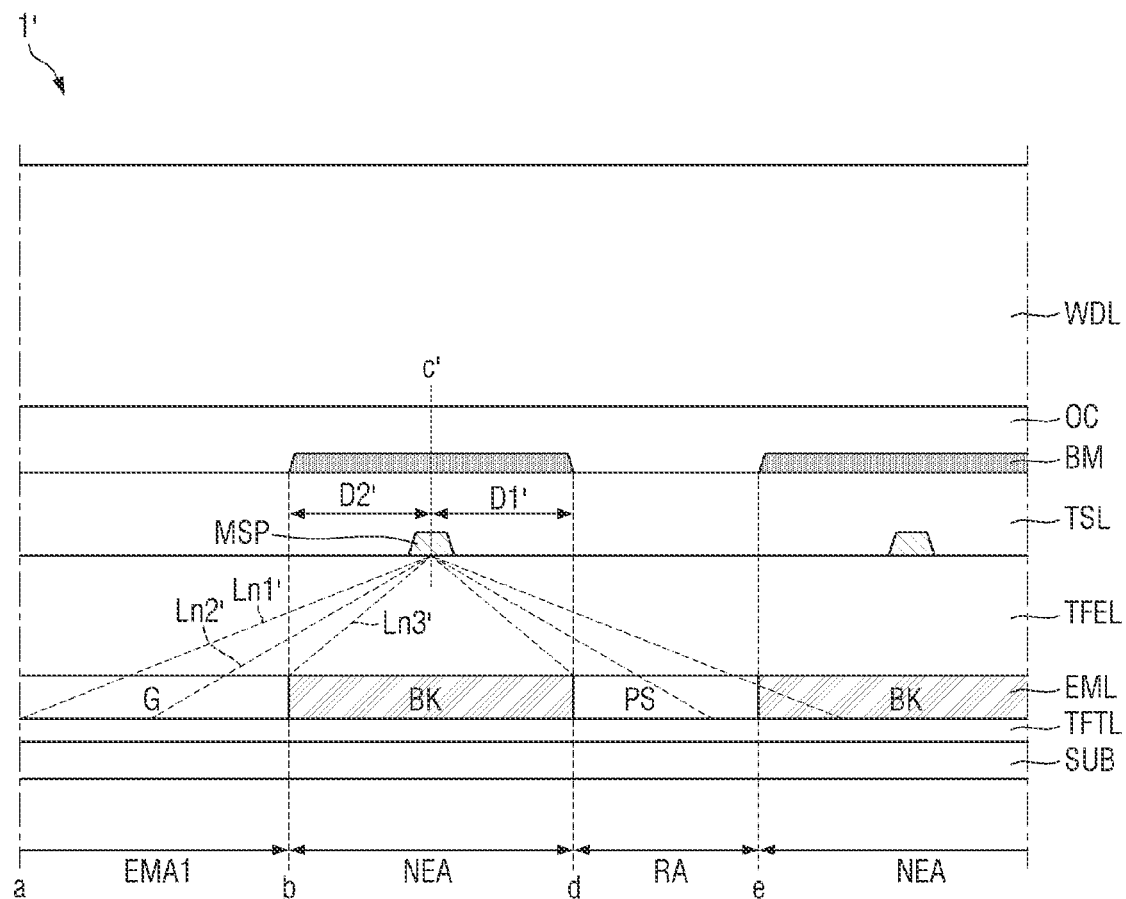
FIG. 13 is a schematic cross-sectional view illustrating an example of a pixel and an optical sensor of a display device according to a comparative example.

FIG. 13 is a schematic cross-sectional view illustrating an example of a pixel and an optical sensor of a display device according to a comparative example.

Referring to FIG. 13, in a display device 1' according to a comparative example, a first distance D1' between the mesh pattern MSP and the light sensing part RA and a second distance D2' between the mesh pattern MSP and the first light emitting part EMA1 may be the same or substantially the same as each other. As another example, the first distance D1' may be greater than the second distance D2'. In this case, some light (e.g., Ln2' and Ln3') from among the light Ln1', Ln2', and Ln3' emitted from the first light emitting part EMA1 and reflected from the lower surface of the mesh pattern MSP may be incident on the light sensing part RA.

In the comparative example of FIG. 13, a ratio of a width of the light sensing part RA to the first distance D1' may be smaller than 2.2.

Because the light Ln2' and Ln3' incident on the light sensing part RA may act as noise of a fingerprint sensing signal, the light Ln2' and Ln3' may reduce a sensitivity of the fingerprint recognition, and may reduce the fingerprint pattern sensibility. In order to minimize or reduce such noise, a light blocking member for blocking the noise lights Ln2' and Ln3' may be further disposed between the encapsulation layer TFEL and the touch sensing layer TSL. In this case, an additional process of disposing the blocking member may cause an increase in processing costs.

Values of the first distance D1 between the mesh pattern MSP and the light sensing part RA in the display device 1 capable of minimizing or reducing the noise lights will be described in more detail with reference to FIGS. 14 to 16.

Figure 14:
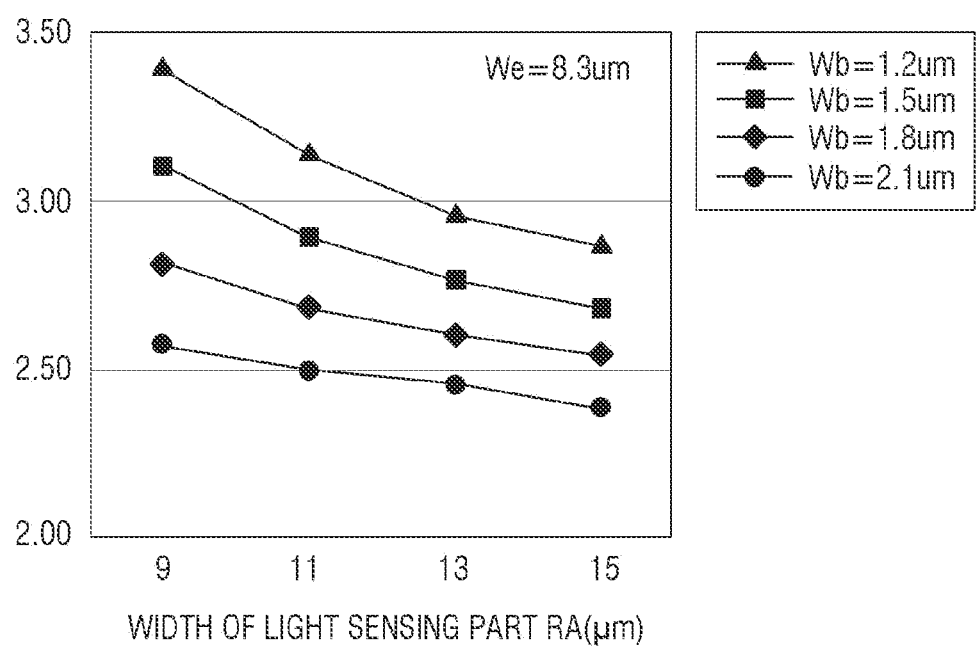
FIG. 14 is a graph illustrating an example of a ratio of a width of a light sensing part to a first distance in the display device according to an embodiment.
Figure 15:
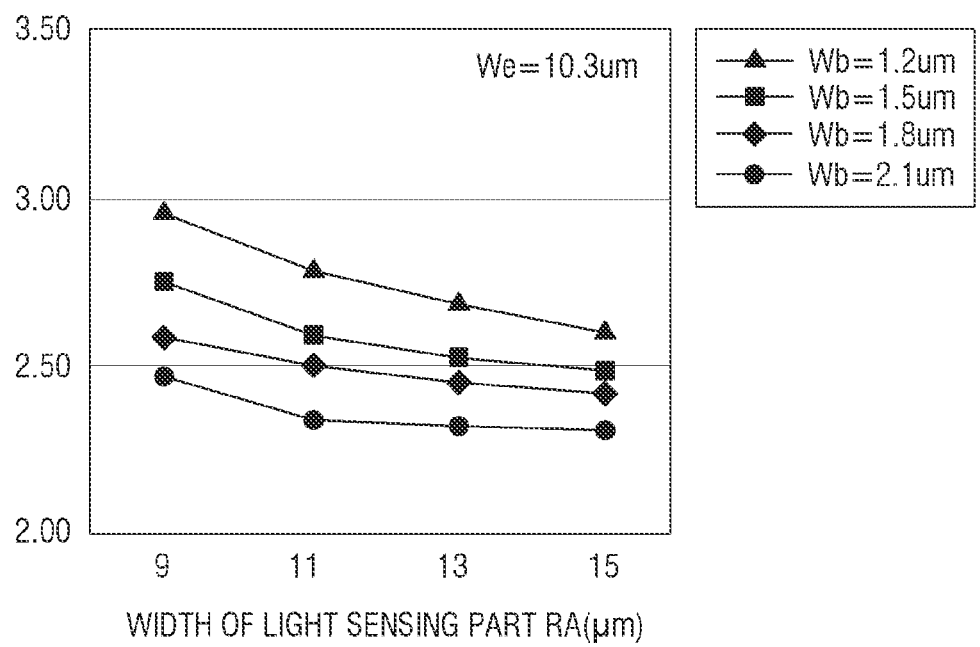
FIG. 15 is a graph illustrating another example of a ratio of a width of a light sensing part to a first distance in the display device according to an embodiment.
Figure 16:
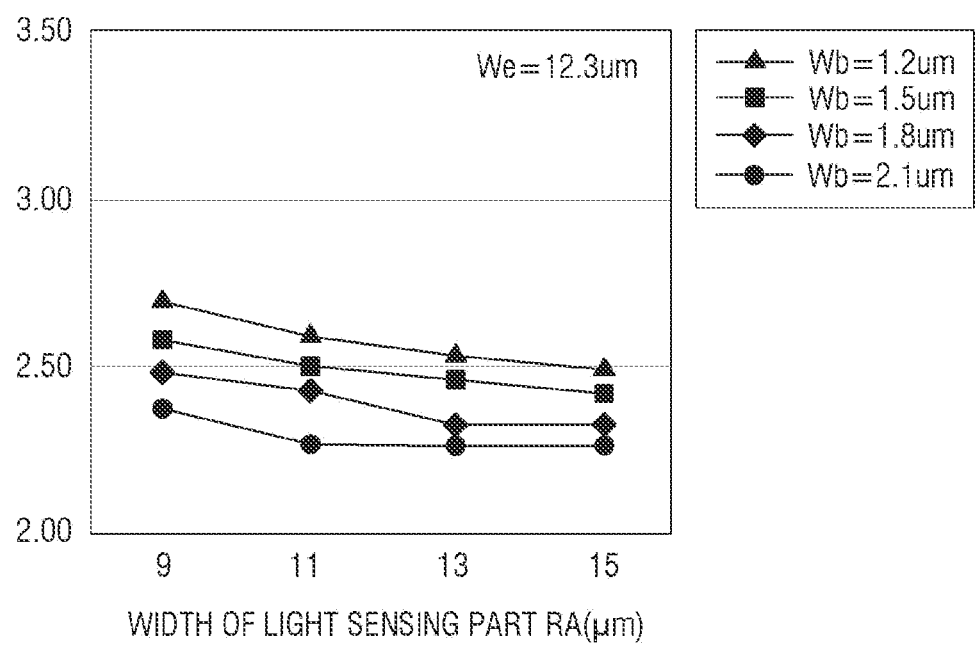
FIG. 16 is a graph illustrating another example of a ratio of a width of a light sensing part to a first distance in the display device according to an embodiment.

FIG. 14 is a graph illustrating an example of a ratio of a width of a light sensing part to a first distance in the display device according to an embodiment, FIG. 15 is a graph illustrating another example of a ratio of a width of a light sensing part to a first distance in the display device according to an embodiment, and FIG. 16 is a graph illustrating another example of a ratio of a width of a light sensing part to a first distance in the display device according to an embodiment.

Thicknesses We of the encapsulation layer TFEL in FIGS. 14 to 16 are 8.3 µm, 10.3 µm, and 12.3 µm, respectively, which are different from each other. For convenience of illustration, FIGS. 14 to 16 show that a width of the bank layer BK is 16.5 µm, a width of the first light emitting part EMA1 is 15.84 µm, and a width of the mesh pattern MSP is about 2 to 3 µm.

In each of the graphs shown in FIGS. 14 to 16, the X-axis indicates a width of the light sensing part RA, and the Y-axis indicates a ratio of the width of the light sensing part RA to the first distance D1. The first distance D1 refers to the distance between the light sensing part RA and the mesh pattern MSP in a plan view. The width of the light sensing part RA may be greater than the first distance D1, but the present disclosure is not limited thereto. In addition, the width of the light sensing part RA may be smaller than the width of the first light emitting part EMA1.

The ratio of the width of the light sensing part RA to the first distance D1 may vary depending on the width of the light sensing part RA, and may vary depending on the thickness Wb of the bank layer BK.

In FIG. 14, as the width of the light sensing part RA increases to each of 9 µm, 11 µm, 13 µm, and 15 µm, the ratio of the width of the light sensing part RA to the first distance D1 may decrease. This is because the rate at which the first distance D1 increases may be greater than the rate at which the width of the light sensing unit RA increases. In addition, as the thickness of the bank layer BK increases to each of 1.2 µm, 1.5 µm, 1.8 µm, and 2.1 µm, the ratio of the width of the light sensing part RA to the first distance D1 may increase. When the thickness We of the encapsulation layer TFEL is 8.3 µm, the ratio of the width of the light sensing part RA to the first distance D1 may have a value of 2.2 to 3.5.

In FIG. 15, as the width of the light sensing part RA increases to each of 9 µm, 11 µm, 13 µm, and 15 µm, the ratio of the width of the light sensing part RA to the first distance D1 may decrease. This is because the rate at which the first distance D1 increases may be greater than the rate at which the width of the light sensing unit RA increases. In addition, as the thickness of the bank layer BK increases to each of 1.2 µm, 1.5 µm, 1.8 µm, and 2.1 µm, the ratio of the width of the light sensing part RA to the first distance D1 may increase. When the thickness We of the encapsulation layer TFEL is 10.3 µm, the ratio of the width of the light sensing part RA to the first distance D1 may have a value of 2.2 to 3.0.

In FIG. 16, as the width of the light sensing part RA increases to each of 9 µm, 11 µm, 13 µm, and 15 µm, the ratio of the width of the light sensing part RA to the first distance D1 may decrease. This is because the rate at which the first distance D1 increases may be greater than the rate at which the width of the light sensing unit RA increases. In addition, as the thickness of the bank layer BK increases to each of 1.2 µm, 1.5 µm, 1.8 µm, and 2.1 µm, the ratio of the width of the light sensing part RA to the first distance D1 may increase. When the thickness We of the encapsulation layer TFEL is 12.3 µm, the ratio of the width of the light sensing part RA to the first distance D1 may have a value of 2.2 to 3.0.

For example, in a case where the thickness We of the encapsulation layer TFEL is 10.3 µm, the width of the light sensing part RA is 11 µm, and the thickness of the bank layer BK is 1.5 µm, internal interference due to light emission of the adjacent pixels PX may be prevented or reduced when the first distance D1 between the mesh pattern MSP and the light sensing part RA is at most 3.83 µm. In this case, the ratio of the width of the light sensing part RA to the first distance D1 may be 2.8.

In the present embodiment, the mesh pattern MSP is disposed to be more adjacent to the light sensing part RA than to the first light emitting part EMA1 so that the ratio of the width of the light sensing part RA to the first distance D1 is in the range of 2.2 to 3.5, such that the light reflected from the lower surface of the mesh pattern MSP may not be incident on the light sensing part RA. In this case, the light may be incident on the bank layer BK that is adjacent to the light sensing part RA. Because the light acting as the noise signals of the optical sensor PS may not be incident on the optical sensor PS, accuracy of the fingerprint sensing signal may be increased. Accordingly, the pattern of the fingerprint F of the finger may be more accurately identified.

In addition, because the light reflected by the mesh pattern MSP may be incident on only the bank layer BK, a blocking member for blocking such light may not be separately disposed. Therefore, processing costs may be reduced.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:
   a substrate;
   a plurality of light emitting parts on the substrate, and configured to emit light;
   a plurality of light sensing parts on the substrate, and configured to sense incident light;
   a bank layer partitioning the plurality of light emitting parts and the plurality of light sensing parts; and
   a touch sensing layer including a touch electrode on the bank layer,
   wherein a first distance between one light sensing part from among the plurality of light sensing parts and the touch electrode in one direction is smaller than a second distance between a first light emitting part of the plurality of light emitting parts and the touch electrode in the one direction.

2. The display device of claim 1, wherein a width of the one light sensing part in the one direction is greater than the first distance.

3. The display device of claim 2, wherein a ratio of the width of the one light sensing part to the first distance in the one direction is greater than 2.2 and smaller than 3.5.

4. The display device of claim 3, wherein a width of the first light emitting part in the one direction is greater than the width of the one light sensing part in the one direction.

5. The display device of claim 1, wherein the touch electrode overlaps with the bank layer.

6. The display device of claim 5, wherein a width of the touch electrode is smaller than a width of the one light sensing part.

7. The display device of claim 5, wherein the touch electrode includes a mesh pattern.

8. The display device of claim 1, wherein the first light emitting part comprises a plurality of first light emitting parts, and the first light emitting parts and the light sensing parts are repeatedly arranged along the one direction.

9. The display device of claim 8, wherein the first light emitting parts are configured to emit light having a green wavelength.

10. The display device of claim 1, further comprising:
an emission layer in each of the plurality of light emitting parts on the substrate;
a photoelectric conversion layer in each of the plurality of light sensing parts on the substrate; and
a common electrode on the emission layer and the photoelectric conversion layer.

11. A display device comprising:
a substrate;
a pixel electrode and a first electrode on the substrate;
a bank layer exposing the pixel electrode and the first electrode;
an emission layer on the pixel electrode;
a photoelectric conversion layer on the first electrode;
a common electrode on the emission layer, the photoelectric conversion layer, and the bank layer;
a touch sensing layer including a touch electrode on the bank layer;
a first hole defined by the touch electrode, and overlapping with the emission layer; and
a second hole overlapping with the photoelectric conversion layer,
wherein the first hole and the second hole overlap with the bank layer.

12. The display device of claim 11, wherein a width in one direction of a portion of the bank layer overlapping with the first hole is greater than a width in the one direction of a portion of the bank layer overlapping with the second hole.

13. The display device of claim 11, wherein the touch electrode overlaps with the bank layer.

14. The display device of claim 11, wherein the touch sensing layer comprises:
a first touch conductive layer;
a touch insulating layer on the first touch conductive layer; and
a second touch conductive layer on the touch insulating layer.

15. The display device of claim 14, wherein the touch electrode comprises:
a plurality of sensor parts arranged along one direction; and
a connection part connecting the plurality of sensor parts to each other, and
wherein the first touch conductive layer includes the connection part, and the second touch conductive layer includes the plurality of sensor parts.

16. The display device of claim 15, wherein the plurality of sensor parts include a mesh pattern.

17. The display device of claim 11, further comprising a light blocking pattern on the touch sensing layer, and overlapping with the bank layer.

18. The display device of claim 17, wherein the first hole and the second hole overlap with the light blocking pattern.

19. A display device comprising:
a substrate;
a plurality of light emitting parts on the substrate, and configured to emit light;
a plurality of light sensing parts on the substrate, and configured to sense incident light;
a bank layer partitioning the plurality of light emitting parts and the plurality of light sensing parts;
a touch sensing layer including a touch electrode on the bank layer;
a first hole defined by the touch electrode, and exposing one of the plurality of light emitting parts; and
a second hole defined by the touch electrode, and exposing one of the plurality of light sensing parts,
wherein the first hole and the second hole overlap with the bank layer.

20. The display device of claim 19, wherein a width in one direction of a portion of the bank layer overlapping with the first hole is greater than a width in the one direction of a portion of the bank layer overlapping with the second hole.

* * * * *